US012465910B2

(12) United States Patent
Sharma et al.

(10) Patent No.: US 12,465,910 B2
(45) Date of Patent: Nov. 11, 2025

(54) COMPOSITIONS, METHODS, AND SYSTEMS FOR SAMPLE PROCESSING WITH MORPHOLOGY-ADJUSTABLE FUNCTIONALIZED PARTICLES

(71) Applicant: Bio-Rad Laboratories, Inc., Hercules, CA (US)

(72) Inventors: Vishal Sharma, Hercules, CA (US); Ronald Lebofsky, Hercules, CA (US); Man Cheng, Hercules, CA (US); Adam McCoy, Hercules, CA (US); Kalyan Handique, Hercules, CA (US); Eric Pomaranski, Hercules, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 429 days.

(21) Appl. No.: 18/076,667

(22) Filed: Dec. 7, 2022

(65) Prior Publication Data

US 2023/0182127 A1  Jun. 15, 2023

Related U.S. Application Data

(60) Provisional application No. 63/288,405, filed on Dec. 10, 2021.

(51) Int. Cl.
*C12N 13/00* (2006.01)
*B01L 3/00* (2006.01)

(52) U.S. Cl.
CPC ............ *B01L 3/502* (2013.01); *C12N 13/00* (2013.01); *B01L 2200/026* (2013.01); *B01L 2200/0668* (2013.01); *B01L 2200/10* (2013.01); *B01L 2200/16* (2013.01); *B01L 2300/047* (2013.01); *B01L 2300/0893* (2013.01)

(58) Field of Classification Search
CPC ............... B01L 3/502; B01L 2300/047; B01J 2219/00317; B01J 2219/00621; B01J 2219/00648; B01J 2219/00722; B01J 19/0046
See application file for complete search history.

(56) References Cited

U.S. PATENT DOCUMENTS

| | | |
|---|---|---|
| 4,475,411 A | 10/1984 | Wellerfors |
| 4,551,435 A | 11/1985 | Liberti et al. |
| 4,710,635 A | 12/1987 | Chupp |
| 5,266,269 A | 11/1993 | Niiyama et al. |
| 5,281,540 A | 1/1994 | Merkh et al. |
| 5,491,343 A | 2/1996 | Brooker |
| 5,541,064 A | 7/1996 | Bacus et al. |
| 5,547,849 A | 8/1996 | Baer et al. |
| 5,851,488 A | 12/1998 | Saul et al. |
| 5,883,370 A | 3/1999 | Walker et al. |
| 5,888,370 A | 3/1999 | Becker et al. |
| 5,993,630 A | 11/1999 | Becker et al. |
| 5,993,632 A | 11/1999 | Becker et al. |
| 6,016,712 A | 1/2000 | Warden et al. |
| 6,127,177 A | 10/2000 | Toner et al. |
| 6,133,030 A | 10/2000 | Bhatia et al. |
| 6,150,180 A | 11/2000 | Parce et al. |
| 6,174,683 B1 | 1/2001 | Hahn et al. |
| 6,221,663 B1 | 4/2001 | Bhatia et al. |
| 6,228,624 B1 | 5/2001 | Terstappen |
| 6,281,008 B1 | 8/2001 | Komai et al. |
| 6,287,832 B1 | 9/2001 | Becker et al. |
| 6,365,362 B1 | 4/2002 | Terstappen et al. |
| 6,410,724 B1 | 6/2002 | Dejean et al. |
| 6,433,134 B1 | 8/2002 | Patron et al. |
| 6,468,810 B1 | 10/2002 | Korpela |
| 6,525,997 B1 | 2/2003 | Narayanaswami et al. |
| 6,563,634 B2 | 5/2003 | Shimada et al. |
| 6,613,525 B2 | 9/2003 | Nelson et al. |
| 6,623,983 B1 | 9/2003 | Terstappen et al. |
| 6,641,708 B1 | 11/2003 | Becker et al. |

(Continued)

FOREIGN PATENT DOCUMENTS

| | | |
|---|---|---|
| CN | 103534360 A | 1/2014 |
| CN | 103894248 A | 7/2014 |

(Continued)

OTHER PUBLICATIONS

"High-throughput imaging of a unique continuous flow microfluidics plate", Scikon Innovation, Application Note, May 2016, https://www.moleculardevices.com/en/assets/app-note/dd/img/high-throughput-imaging-of-a-unique-continuous-flow-microfluidics-plate#gref.

Chen, H., et al., "High-throughput, deterministic single cell trapping and long-term clonal cell culture in microfluidic devices", Lab Chip. Feb. 21, 2015;15(4):1072-83. doi: 10.1039/c4lc01176g. PMID: 25519528.

Dura, Burak, et al., "scFTD-seq: freeze-thaw lysis based, portable approach toward highly distributed single-cell 3' mRNA profiling", Nucleic Acids Research, 2019, vol. 47, No. 3, published online Nov. 20, 2018.

Guo, P., et al., "Microfluidic capture and release of bacteria in a conical nanopore array", Lab Chip. vol. 12, p. 558-561, 2012, published online Nov. 2011.

(Continued)

*Primary Examiner* — Sahana S Kaup
(74) *Attorney, Agent, or Firm* — Thomas C. Meyers; Sullivan & Worcester LLP

(57) ABSTRACT

Inventions covered include methods, systems, and compositions for sample processing, involving morphology-adjustable (e.g., tunable on-demand) functionalized particles. In some embodiments, a method can include distributing a set of functionalized particles, in a first morphological state, across a set of partitions; transitioning the set of functionalized particles, at the set of partitions, from the first morphological state to a second morphological state; transitioning the set of functionalized particles, at the set of partitions, from the second morphological state to a third morphological state, and inducing interactions between the set of functionalized particles and a set of targets, within the set of partitions and according to a set of operations with a set of process fluids.

20 Claims, 13 Drawing Sheets

(56) References Cited

U.S. PATENT DOCUMENTS

| | | |
|---|---|---|
| 6,645,731 B2 | 11/2003 | Terstappen et al. |
| 6,692,952 B1 | 2/2004 | Braff et al. |
| 6,790,330 B2 | 9/2004 | Gascoyne et al. |
| 6,821,484 B1 | 11/2004 | Gregersen |
| 6,861,259 B2 | 3/2005 | Columbus |
| 6,866,823 B2 | 3/2005 | Wardlaw |
| 6,960,449 B2 | 11/2005 | Wang et al. |
| 7,008,789 B2 | 3/2006 | Gambini et al. |
| 7,035,170 B2 | 4/2006 | Narayanaswami et al. |
| 7,046,357 B2 | 5/2006 | Weinberger et al. |
| 7,148,492 B2 | 12/2006 | Loney et al. |
| 7,172,866 B2 | 2/2007 | Hahn et al. |
| 7,198,901 B1 | 4/2007 | Rachlin |
| 7,217,520 B2 | 5/2007 | Tsinberg et al. |
| 7,238,521 B2 | 7/2007 | Hahn et al. |
| 7,248,352 B2 | 7/2007 | Hamamatsu et al. |
| 7,258,990 B2 | 8/2007 | Falcovitz-Gerassi et al. |
| 7,266,777 B2 | 9/2007 | Scott et al. |
| 7,294,468 B2 | 11/2007 | Bell et al. |
| 7,316,897 B2 | 1/2008 | Bisconte et al. |
| 7,332,288 B2 | 2/2008 | Terstappen et al. |
| 7,338,760 B2 | 3/2008 | Gong et al. |
| 7,354,389 B2 | 4/2008 | Kureshy et al. |
| 7,439,062 B2 | 10/2008 | Bhatt et al. |
| 7,449,558 B2 | 11/2008 | Yao et al. |
| 7,449,778 B2 | 11/2008 | Sander |
| 7,507,528 B2 | 3/2009 | Albert et al. |
| 7,588,672 B2 | 9/2009 | Unger et al. |
| 7,595,157 B2 | 9/2009 | Tsinberg |
| 7,597,528 B2 | 10/2009 | Rodi |
| 7,604,777 B2 | 10/2009 | Columbus |
| 7,638,464 B2 | 12/2009 | Fagnani et al. |
| 7,695,956 B2 | 4/2010 | Tsinberg et al. |
| 7,704,322 B2 | 4/2010 | Hansen et al. |
| 7,710,563 B2 | 5/2010 | Betzig et al. |
| 7,738,320 B2 | 6/2010 | Taha |
| 7,763,704 B2 | 7/2010 | Ding et al. |
| 7,815,863 B2 | 10/2010 | Kagan et al. |
| 7,858,757 B2 | 12/2010 | Hollmann et al. |
| 7,863,012 B2 | 1/2011 | Rao et al. |
| 7,901,950 B2 | 3/2011 | Connelly et al. |
| 7,964,349 B2 | 6/2011 | Bell et al. |
| 8,008,032 B2 | 8/2011 | Forsyth et al. |
| 8,013,298 B2 | 9/2011 | Khursheed |
| 8,021,614 B2 | 9/2011 | Huang et al. |
| 8,103,080 B2 | 1/2012 | George et al. |
| 8,105,769 B2 | 1/2012 | Bell et al. |
| 8,105,780 B2 | 1/2012 | Su et al. |
| 8,131,053 B2 | 3/2012 | Ortyn et al. |
| 8,158,410 B2 | 4/2012 | Tang et al. |
| 8,174,698 B2 | 5/2012 | Peter et al. |
| 8,175,371 B2 | 5/2012 | George et al. |
| 8,186,913 B2 | 5/2012 | Toner et al. |
| 8,211,301 B2 | 7/2012 | Safar et al. |
| 8,232,112 B2 | 7/2012 | Willson et al. |
| 8,252,517 B2 | 8/2012 | Thomas et al. |
| 8,293,524 B2 | 10/2012 | Ionescu-Zanetti et al. |
| 8,304,230 B2 | 11/2012 | Toner et al. |
| 8,329,422 B2 | 12/2012 | Rao et al. |
| 8,372,579 B2 | 2/2013 | Toner et al. |
| 8,372,584 B2 | 2/2013 | Shoemaker et al. |
| 8,406,498 B2 | 3/2013 | Ortyn et al. |
| 8,465,916 B2 | 6/2013 | Bell et al. |
| 8,628,923 B2 | 1/2014 | Hamilton et al. |
| 8,658,418 B2 | 2/2014 | Daridon |
| 8,680,025 B2 | 3/2014 | Cooney |
| 8,730,479 B2 | 5/2014 | Ness et al. |
| 8,765,454 B2 | 7/2014 | Zhou et al. |
| 8,771,609 B2 | 7/2014 | Ehben et al. |
| 8,802,367 B2 | 8/2014 | Taniguchi et al. |
| 8,936,945 B2 | 1/2015 | Handique et al. |
| 8,986,988 B2 | 3/2015 | Karnik et al. |
| 9,103,754 B2 | 8/2015 | Handique et al. |
| 9,110,026 B2 | 8/2015 | Collins |
| 9,133,499 B2 | 9/2015 | Di Carlo et al. |
| 9,145,540 B1 | 9/2015 | Deutsch et al. |
| 9,174,216 B2 | 11/2015 | Handique et al. |
| 9,188,586 B2 | 11/2015 | Fan et al. |
| 9,194,001 B2 | 11/2015 | Brenner |
| 9,200,245 B2 | 12/2015 | Deutsch et al. |
| 9,201,060 B2 | 12/2015 | Voldman et al. |
| 9,249,459 B2 | 2/2016 | Hamilton et al. |
| 9,260,753 B2 | 2/2016 | Xie et al. |
| 9,278,355 B2 | 3/2016 | Kajiyama et al. |
| 9,290,808 B2 | 3/2016 | Fodor et al. |
| 9,290,809 B2 | 3/2016 | Fodor et al. |
| 9,304,065 B2 | 4/2016 | Fowler et al. |
| 9,315,768 B2 | 4/2016 | Vrouwe et al. |
| 9,315,857 B2 | 4/2016 | Fu et al. |
| 9,329,170 B2 | 5/2016 | Clarke et al. |
| 9,364,829 B2 | 6/2016 | Heid et al. |
| 9,410,201 B2 | 8/2016 | Hindson et al. |
| 9,429,500 B2 | 8/2016 | Fowler et al. |
| 9,506,845 B2 | 11/2016 | Fowler et al. |
| 9,507,609 B2 | 11/2016 | Glazer et al. |
| 9,513,195 B2 | 12/2016 | Handique et al. |
| 9,567,645 B2 | 2/2017 | Fan et al. |
| 9,567,646 B2 | 2/2017 | Fan et al. |
| 9,598,736 B2 | 3/2017 | Fan et al. |
| 9,610,581 B2 | 4/2017 | Handique et al. |
| 9,637,799 B2 | 5/2017 | Fan et al. |
| 9,701,998 B2 | 7/2017 | Hindson et al. |
| 9,707,562 B2 | 7/2017 | Handique et al. |
| 9,708,659 B2 | 7/2017 | Fodor et al. |
| 9,746,413 B2 | 8/2017 | Handique et al. |
| 9,752,181 B2 | 9/2017 | Handique et al. |
| 9,757,707 B2 | 9/2017 | Husain et al. |
| 9,802,193 B2 | 10/2017 | Handique et al. |
| 9,840,732 B2 | 12/2017 | Anderson et al. |
| 9,845,502 B2 | 12/2017 | Fodor et al. |
| 9,850,483 B2 | 12/2017 | Clarke et al. |
| 9,952,126 B2 | 4/2018 | Fowler et al. |
| 9,995,662 B2 | 6/2018 | Husain et al. |
| 10,101,336 B2 | 10/2018 | Bergo |
| 10,335,982 B2 | 7/2019 | Nicolau et al. |
| 10,376,889 B1 | 8/2019 | Masquelier et al. |
| 10,391,492 B2 | 8/2019 | Handique et al. |
| 10,391,493 B2 | 8/2019 | Handique et al. |
| 10,401,373 B1 | 9/2019 | Holmes et al. |
| 10,408,736 B1 | 9/2019 | Handique |
| 10,533,152 B1 | 1/2020 | Belgrader et al. |
| 10,718,007 B2 | 7/2020 | Handique et al. |
| 10,722,880 B2 | 7/2020 | Spuhler et al. |
| 10,981,167 B2 | 4/2021 | Blainey et al. |
| RE48,913 E | 2/2022 | Fodor et al. |
| 2002/0009759 A1 | 1/2002 | Terstappen et al. |
| 2002/0028431 A1 | 3/2002 | Julien |
| 2002/0036142 A1 | 3/2002 | Gascoyne et al. |
| 2002/0036823 A1 | 3/2002 | Shimada et al. |
| 2002/0098535 A1 | 7/2002 | Wang et al. |
| 2002/0109838 A1 | 8/2002 | Columbus |
| 2002/0119482 A1 | 8/2002 | Nelson et al. |
| 2002/0192808 A1 | 12/2002 | Gambini et al. |
| 2003/0069173 A1 | 4/2003 | Hawley-Nelson et al. |
| 2003/0129676 A1 | 7/2003 | Terstappen et al. |
| 2003/0138941 A1 | 7/2003 | Gong et al. |
| 2004/0029241 A1 | 2/2004 | Hahn et al. |
| 2004/0106130 A1 | 6/2004 | Besemer et al. |
| 2004/0160599 A1 | 8/2004 | Hamamatsu et al. |
| 2004/0191891 A1 | 9/2004 | Tsinberg et al. |
| 2004/0218472 A1 | 11/2004 | Narayanaswami et al. |
| 2004/0229349 A1 | 11/2004 | Daridon |
| 2004/0248318 A1 | 12/2004 | Weinberger et al. |
| 2005/0001176 A1 | 1/2005 | Loney et al. |
| 2005/0014201 A1 | 1/2005 | Deuthsch |
| 2005/0037343 A1 | 2/2005 | Fagnani et al. |
| 2005/0042685 A1 | 2/2005 | Albert et al. |
| 2005/0063863 A1 | 3/2005 | Columbus |
| 2005/0095582 A1 | 5/2005 | Gillim-Ross et al. |
| 2005/0112589 A1 | 5/2005 | Hahn et al. |
| 2005/0118640 A1 | 6/2005 | Kureshy et al. |
| 2005/0123445 A1 | 6/2005 | Blecka et al. |
| 2005/0158804 A1 | 7/2005 | Yao et al. |
| 2005/0164236 A1 | 7/2005 | Su et al. |

(56) References Cited

U.S. PATENT DOCUMENTS

| | | |
|---|---|---|
| 2005/0181463 A1 | 8/2005 | Rao et al. |
| 2005/0265815 A1 | 12/2005 | Rodi |
| 2006/0040274 A1 | 2/2006 | Tsinberg |
| 2006/0040407 A1 | 2/2006 | Falcovitz-Gerassi et al. |
| 2006/0050142 A1 | 3/2006 | Scott et al. |
| 2006/0115380 A1 | 6/2006 | Kagan et al. |
| 2006/0128006 A1 | 6/2006 | Gerhardt et al. |
| 2006/0141045 A1 | 6/2006 | Bhatt et al. |
| 2006/0147959 A1 | 7/2006 | Bell et al. |
| 2006/0160243 A1 | 7/2006 | Tang et al. |
| 2006/0257992 A1 | 11/2006 | McDevitt et al. |
| 2006/0263250 A1 | 11/2006 | Blouin et al. |
| 2007/0026381 A1 | 2/2007 | Huang et al. |
| 2007/0053800 A1 | 3/2007 | Lehto |
| 2007/0111302 A1 | 5/2007 | Handique et al. |
| 2007/0154960 A1 | 7/2007 | Connelly et al. |
| 2007/0161051 A1 | 7/2007 | Tsinberg et al. |
| 2007/0172903 A1 | 7/2007 | Toner et al. |
| 2007/0238089 A1 | 10/2007 | Rosenthal et al. |
| 2007/0243523 A1 | 10/2007 | Ionescu-Zanetti et al. |
| 2007/0252265 A1 | 11/2007 | Sander |
| 2007/0264675 A1 | 11/2007 | Toner et al. |
| 2007/0264705 A1 | 11/2007 | Dodgson |
| 2007/0275418 A1 | 11/2007 | Hollmann et al. |
| 2008/0003224 A1 | 1/2008 | Fong et al. |
| 2008/0014589 A1 | 1/2008 | Link et al. |
| 2008/0068588 A1 | 3/2008 | Hess et al. |
| 2008/0090239 A1 | 4/2008 | Shoemaker et al. |
| 2008/0096212 A1 | 4/2008 | Bell et al. |
| 2008/0113358 A1 | 5/2008 | Kapur et al. |
| 2008/0113906 A1 | 5/2008 | Ding et al. |
| 2008/0124726 A1 | 5/2008 | Monforte |
| 2008/0182273 A1 | 7/2008 | Hansen et al. |
| 2008/0206751 A1 | 8/2008 | Squirrell et al. |
| 2008/0207615 A1 | 8/2008 | Bell et al. |
| 2008/0220422 A1 | 9/2008 | Shoemaker et al. |
| 2008/0234264 A1 | 9/2008 | Bell et al. |
| 2008/0240539 A1 | 10/2008 | George et al. |
| 2008/0248043 A1 | 10/2008 | Babcook et al. |
| 2008/0257735 A1 | 10/2008 | Jeon et al. |
| 2008/0317325 A1 | 12/2008 | Ortyn et al. |
| 2009/0014360 A1 | 1/2009 | Toner et al. |
| 2009/0061450 A1 | 3/2009 | Hunter |
| 2009/0081773 A1 | 3/2009 | Kaufman |
| 2009/0141593 A1 | 6/2009 | Taha |
| 2009/0153844 A1 | 6/2009 | Peter et al. |
| 2009/0162853 A1 | 6/2009 | Clark et al. |
| 2009/0215088 A1 | 8/2009 | Forsyth et al. |
| 2009/0220979 A1 | 9/2009 | Davis et al. |
| 2009/0258383 A1 | 10/2009 | Kovac et al. |
| 2009/0317836 A1 | 12/2009 | Kuhn et al. |
| 2010/0087325 A1 | 4/2010 | Buermann |
| 2010/0112643 A1 | 5/2010 | Archer et al. |
| 2010/0120077 A1 | 5/2010 | Daridon |
| 2010/0127168 A1 | 5/2010 | Khursheed |
| 2010/0159590 A1 | 6/2010 | Alley et al. |
| 2010/0210009 A1 | 8/2010 | Willson et al. |
| 2010/0227387 A1 | 9/2010 | Safar et al. |
| 2010/0232675 A1 | 9/2010 | Ortyn et al. |
| 2010/0233693 A1 | 9/2010 | Kopf-Sill et al. |
| 2010/0261179 A1 | 10/2010 | Betley et al. |
| 2010/0291584 A1 | 11/2010 | Tseng et al. |
| 2010/0304485 A1 | 12/2010 | Karnik et al. |
| 2010/0304978 A1 | 12/2010 | Robbins et al. |
| 2011/0003380 A1 | 1/2011 | Miltenyi et al. |
| 2011/0005932 A1 | 1/2011 | Jovanovich et al. |
| 2011/0045994 A1 | 2/2011 | Voldman et al. |
| 2011/0053151 A1 | 3/2011 | Hansen et al. |
| 2011/0104718 A1 | 5/2011 | Rao et al. |
| 2011/0117634 A1 | 5/2011 | Halamish et al. |
| 2011/0143964 A1 | 6/2011 | Zhou et al. |
| 2011/0227558 A1 | 9/2011 | Mannion et al. |
| 2011/0236904 A1 | 9/2011 | Hauch et al. |
| 2011/0280467 A1 | 11/2011 | George et al. |
| 2012/0021456 A1 | 1/2012 | Levine et al. |
| 2012/0071355 A9 | 3/2012 | Cooney |
| 2012/0071643 A1 | 3/2012 | Helfer et al. |
| 2012/0129190 A1 | 5/2012 | Chiu et al. |
| 2012/0156675 A1 | 6/2012 | Lueerssen et al. |
| 2012/0164679 A1 | 6/2012 | Vrouwe et al. |
| 2012/0194805 A1 | 8/2012 | Ness et al. |
| 2012/0270310 A1 | 10/2012 | Spence et al. |
| 2012/0309104 A1 | 12/2012 | Uematsu et al. |
| 2012/0316074 A1 | 12/2012 | Saxonov |
| 2013/0011832 A1 | 1/2013 | Moreno et al. |
| 2013/0116102 A1 | 5/2013 | Hansen |
| 2013/0130376 A1 | 5/2013 | Serobyan et al. |
| 2013/0171628 A1 | 7/2013 | Di et al. |
| 2013/0210127 A1 | 8/2013 | Williams et al. |
| 2013/0230860 A1 | 9/2013 | Park et al. |
| 2013/0244906 A1 | 9/2013 | Collins |
| 2013/0259635 A1 | 10/2013 | Maslana et al. |
| 2013/0309778 A1 | 11/2013 | Lowe et al. |
| 2014/0051595 A1 | 2/2014 | So |
| 2014/0087370 A1 | 3/2014 | Maeshima |
| 2014/0155295 A1 | 6/2014 | Hindson et al. |
| 2014/0173443 A1 | 6/2014 | Hawkins et al. |
| 2014/0212881 A1 | 7/2014 | Handique et al. |
| 2014/0213487 A1 | 7/2014 | Freudenthal et al. |
| 2014/0272965 A1 | 9/2014 | Handique et al. |
| 2014/0315237 A1 | 10/2014 | Masujima et al. |
| 2014/0329301 A1 | 11/2014 | Handique |
| 2014/0357511 A1 | 12/2014 | Handique et al. |
| 2014/0370612 A1 | 12/2014 | Bassler et al. |
| 2015/0011432 A1 | 1/2015 | Saxonov |
| 2015/0089359 A1 | 3/2015 | Brisebois |
| 2015/0093306 A1 | 4/2015 | Thorne et al. |
| 2015/0133319 A1 | 5/2015 | Fu et al. |
| 2015/0160135 A1 | 6/2015 | Tibbe et al. |
| 2015/0160931 A1 | 6/2015 | Glazer et al. |
| 2015/0204864 A1 | 7/2015 | Fan et al. |
| 2015/0253251 A1 | 9/2015 | McKee et al. |
| 2015/0299784 A1 | 10/2015 | Fan et al. |
| 2015/0376609 A1 | 12/2015 | Hindson et al. |
| 2016/0008814 A1 | 1/2016 | Handique et al. |
| 2016/0024572 A1 | 1/2016 | Shishkin et al. |
| 2016/0024761 A1 | 1/2016 | Korb |
| 2016/0053253 A1 | 2/2016 | Salathia et al. |
| 2016/0060621 A1 | 3/2016 | Agresti et al. |
| 2016/0108464 A1 | 4/2016 | Saxonov et al. |
| 2016/0130649 A1 | 5/2016 | Xie et al. |
| 2016/0199838 A1 | 7/2016 | Handique et al. |
| 2016/0209319 A1 | 7/2016 | Adalsteinsson et al. |
| 2016/0251714 A1 | 9/2016 | Conant et al. |
| 2016/0289669 A1 | 10/2016 | Fan et al. |
| 2016/0314242 A1 | 10/2016 | Schnall-Levin et al. |
| 2016/0367991 A1 | 12/2016 | Petersen et al. |
| 2017/0044525 A1 | 2/2017 | Kaper et al. |
| 2017/0073405 A1 | 3/2017 | Fuh et al. |
| 2017/0153219 A1 | 6/2017 | Handique et al. |
| 2017/0276682 A1 | 9/2017 | Park |
| 2017/0307502 A1 | 10/2017 | Mason et al. |
| 2017/0320038 A1 | 11/2017 | Husain et al. |
| 2017/0321252 A1 | 11/2017 | Hindson et al. |
| 2017/0335385 A1 | 11/2017 | Hindson et al. |
| 2017/0356027 A1 | 12/2017 | Hindson et al. |
| 2017/0370951 A1 | 12/2017 | Buffiere et al. |
| 2018/0030515 A1 | 2/2018 | Regev et al. |
| 2018/0037942 A1 | 2/2018 | Fu |
| 2018/0051321 A1 | 2/2018 | Hindson et al. |
| 2018/0080075 A1 | 3/2018 | Brenner et al. |
| 2018/0088112 A1 | 3/2018 | Fan et al. |
| 2018/0093268 A1 | 4/2018 | Meier et al. |
| 2018/0094298 A1 | 4/2018 | Hindson et al. |
| 2018/0094312 A1 | 4/2018 | Hindson et al. |
| 2018/0105808 A1 | 4/2018 | Mikkelsen et al. |
| 2018/0112266 A1 | 4/2018 | Hindson et al. |
| 2018/0127744 A1 | 5/2018 | Hu et al. |
| 2018/0127823 A1 | 5/2018 | Shekhar et al. |
| 2018/0272296 A1 | 9/2018 | Link et al. |
| 2018/0274027 A1 | 9/2018 | Hindson et al. |
| 2018/0282804 A1 | 10/2018 | Hindson et al. |
| 2018/0311636 A1 | 11/2018 | Jacobson et al. |
| 2018/0320224 A1 | 11/2018 | Gaublomme et al. |

(56) References Cited

U.S. PATENT DOCUMENTS

| | | |
|---|---|---|
| 2018/0372741 A1 | 12/2018 | Matsumoto et al. |
| 2019/0002814 A1 | 1/2019 | Masquelier et al. |
| 2019/0024156 A1 | 1/2019 | Seul et al. |
| 2019/0064168 A1 | 2/2019 | Handique et al. |
| 2019/0106739 A1 | 4/2019 | Terbrueggen |
| 2019/0108464 A1 | 4/2019 | Chapman et al. |
| 2019/0153532 A1 | 5/2019 | Bharadwaj et al. |
| 2019/0241944 A1 | 8/2019 | Cater et al. |
| 2019/0285644 A1 | 9/2019 | Regev et al. |
| 2019/0338353 A1 | 11/2019 | Belgrader et al. |
| 2020/0140932 A1 | 5/2020 | Prins et al. |
| 2020/0209229 A1 | 7/2020 | Strong et al. |
| 2020/0306753 A1 | 10/2020 | Meier et al. |
| 2021/0171939 A1 | 6/2021 | McCoy et al. |

FOREIGN PATENT DOCUMENTS

| | | | |
|---|---|---|---|
| CN | 103998394 A | 8/2014 | |
| CN | 104789468 A | 7/2015 | |
| CN | 110214193 A | 9/2019 | |
| EP | 2414548 A2 | 2/2012 | |
| EP | 2414548 B1 | 10/2015 | |
| JP | 2001514185 A | 9/2001 | |
| JP | 2005513999 A | 5/2005 | |
| JP | 2006098696 A | 4/2006 | |
| JP | 2006522101 A | 9/2006 | |
| JP | 2008136415 A | 6/2008 | |
| JP | 2009195160 A | 9/2009 | |
| JP | 2015527588 A | 9/2015 | |
| JP | 2017063716 A | 4/2017 | |
| JP | 2019521096 A | 7/2019 | |
| WO | 9910362 A1 | 3/1999 | |
| WO | 02061129 A2 | 8/2002 | |
| WO | 2003035909 A2 | 5/2003 | |
| WO | 2004081021 A2 | 9/2004 | |
| WO | 2006098696 A1 | 9/2006 | |
| WO | 2010120818 A2 | 10/2010 | |
| WO | 2010142954 A1 | 12/2010 | |
| WO | 2013176767 A1 | 11/2013 | |
| WO | 2015133337 A1 | 9/2015 | |
| WO | 2016149639 A1 | 9/2016 | |
| WO | 2016151719 A1 | 9/2016 | |
| WO | 2016162997 A1 | 10/2016 | |
| WO | WO-2017100347 A1 * | 6/2017 | ........ B01L 3/502792 |
| WO | 2017203059 A1 | 11/2017 | |
| WO | 2018013723 A1 | 1/2018 | |
| WO | 2018058073 A2 | 3/2018 | |
| WO | 2018111670 A2 | 6/2018 | |
| WO | 2018183723 A1 | 10/2018 | |
| WO | 2019060830 A1 | 3/2019 | |
| WO | WO-2019126789 A1 * | 6/2019 | ........... C12Q 1/6806 |
| WO | 2019157529 A1 | 8/2019 | |
| WO | 2019165318 A1 | 8/2019 | |

OTHER PUBLICATIONS

Lindstrom, Sara , "Microwell devices for single-analyses", Royal Institute of Technology, Stockholm, Sweden, 2009, pp. 1-80., Feb. 12, 2018 00:00:00.0.

Murphy, Travis W., et al., "Recent advances in the use of microfluidic technologies for signs, e cell analysis", Analyst, Oct. 26, 2017, vol. 143, pp. 60-80.

Sarkar, S. , et al., "Phenotypic drug profiling in droplet microfluidics for better targeting of drug-resistant tumors", Lab on a chip., vol. 15, 23 (2015): 4441-50. doi:10.1039/c5lc00923e.

Seale, K. T. , et al., "Mirrored pyramidal wells for simultaneous multiple vantage point microscop", Journal of Microscopy (2008) 232 1-6. (Year: 2008).

Stahl, Patrik L., et al., "Visualization and analysis of gene expression in tissue sections by spatial transcriptomics", sciencemag.org, Jul. 2016, vol. 353, Issue 6294, pp. 78-82.

Sugio, Yoshihiro , et al., "An agar-based on-chip neural-cell cultivation system for stepwise control of network pattem generation during cultivation", Sensors and Actuators, B99, 2004, pp. 156-162.

Tan, Wei-Heang , et al., "A trap-and-release integrated microfluidic system for dynamic microarray applications", PNAS (2007) 104 1146-1151. (Year: 2007).

Tan, Wei-Heang , et al., "A trap-and-release integrated microfluidic system for dynamic microarray applications", Supplemental information from Tan et al. PNAS (2007) 104. (Year: 2007).

Yeh, EC , et al., "Self-powered integrated microfluidic point-of-care low-cost enabling (SIMPLE) chip", Sci Adv. Mar. 22, 2017;3(3):e1501645. doi:10.1126/sciadv. 1501645. PMID: 28345028; PMCID: PM 5362183.

Yuan, J. , et al., "An Automated Microwell Platform for Large-Scale Single Cell RNA-Seq.", Sci Rep. Sep. 27, 2016;6:33883. doi: 10.1038/srep33883. PMID: 27670648; PMCID: PMC5037380.

Klein, Allon M., et al., "Droplet barcoding for single cell transcriptomics applied to embryonic stem cells", Cell, 2015, vol. 161, pp. 1187-1201.

Nishigaki, K. , et al., "Type II restriction endonucleases cleave single-stranded DNAs in general", Nucleic Acids Res., 13(16), pp. 5747-5760, Aug. 26, 1985 (Aug. 26, 1985).

Zilionis, Rapolas , et al., "Single-cell barcoding and sequencing using droplet microfluidics", Nature Protocols, 2017, vol. 12, No. 1, pp. 44-73.

Benters, Rudiger , et al., "DNA microarrays with PAMAM dendritic linker systems", Nucleic Acids Research, 2002, vol. 30, No. 2 e10.

* cited by examiner

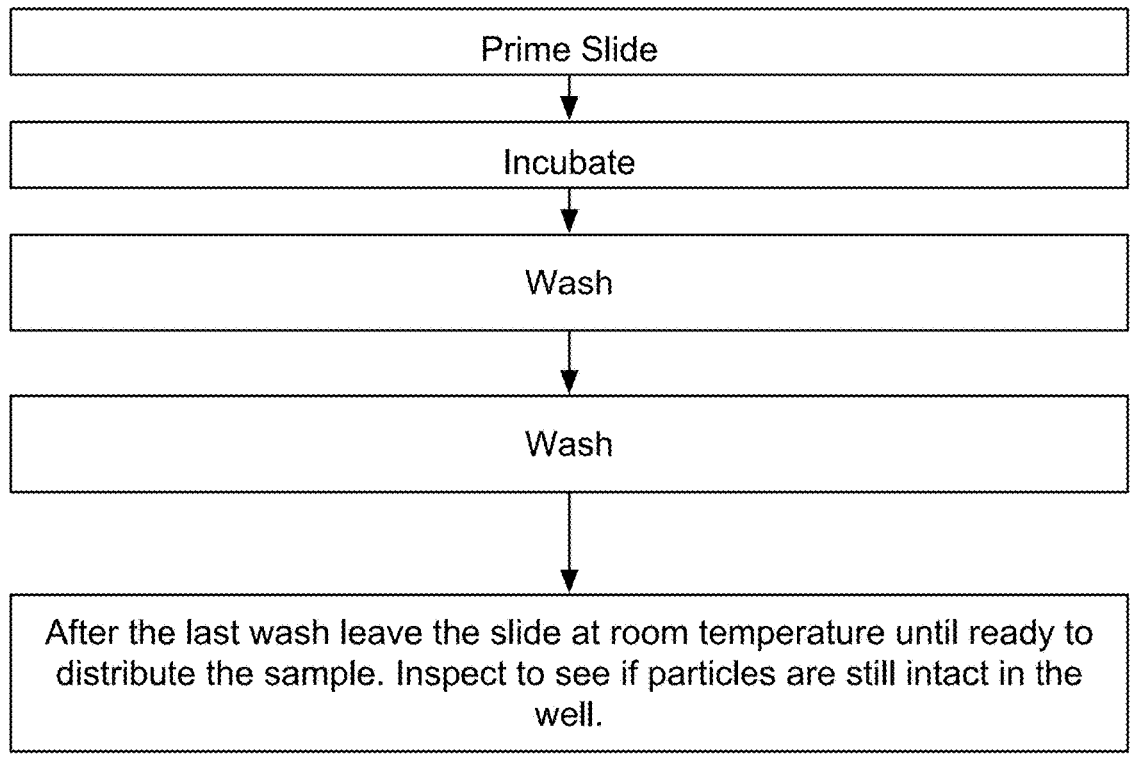

```
┌─────────────────────────────────────┐
│           Prime Slide                │
└─────────────────┬───────────────────┘
                  ▼
┌─────────────────────────────────────┐
│            Incubate                  │
└─────────────────┬───────────────────┘
                  ▼
┌─────────────────────────────────────┐
│              Wash                    │
└─────────────────┬───────────────────┘
                  ▼
┌─────────────────────────────────────┐
│              Wash                    │
└─────────────────┬───────────────────┘
                  ▼
```

After the last wash leave the slide at room temperature until ready to distribute the sample. Inspect to see if particles are still intact in the well.

Functionalized Particles Rehydrated (Exemplary 3rd Morphological State)

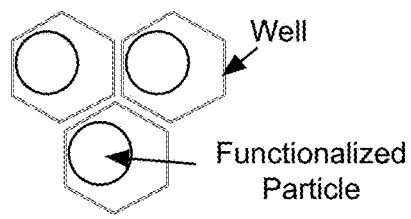

Functionalized Particles Treated with Process Fluids

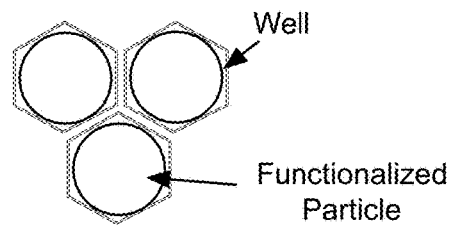

FIGURE 3

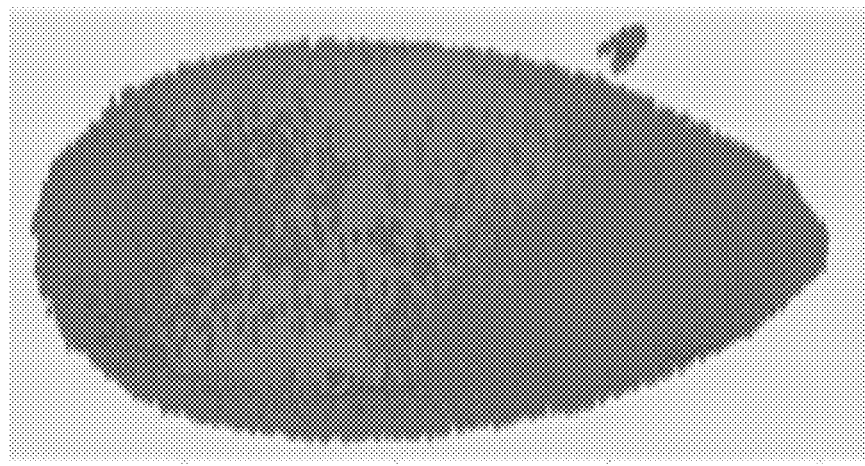
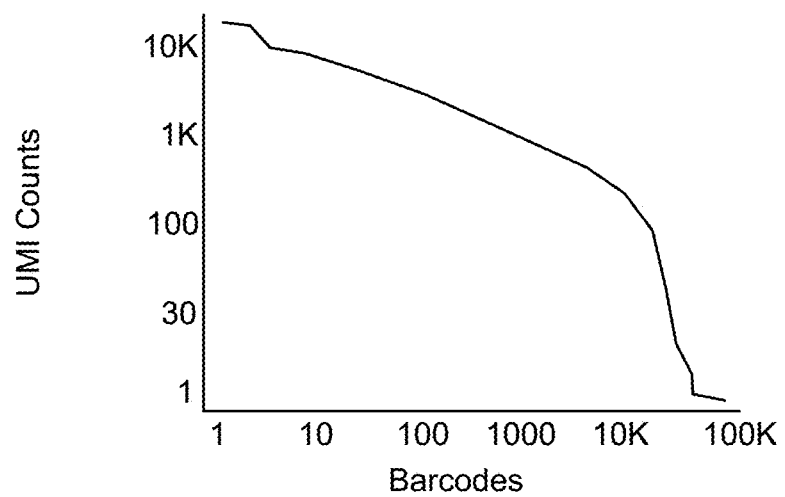
FIGURE 7

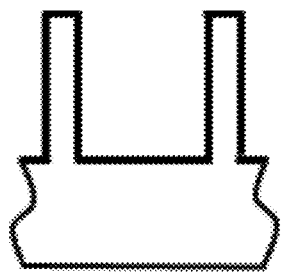
Single Microwell of an Array
Functionalized Particle
Deliver Functionalized Particles to Wells
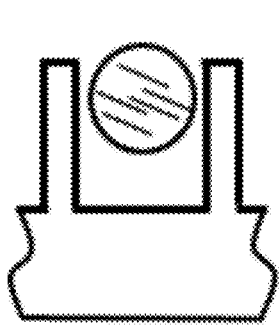
Cause Functionalized Particles to Swell
(e.g., Change Buffer)
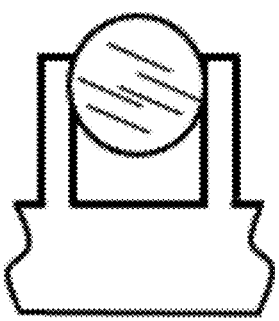
Functionalized particle seals partition as a semi-permeable particle
FIGURE 9A

COMPOSITIONS, METHODS, AND SYSTEMS FOR SAMPLE PROCESSING WITH MORPHOLOGY-ADJUSTABLE FUNCTIONALIZED PARTICLES

CROSS-REFERENCE TO RELATED APPLICATIONS

This application claims the benefit of U.S. Provisional Application No. 63/288,405 filed on 10 Dec. 2021, which is incorporated in its entirety herein by this reference.

TECHNICAL FIELD

This invention relates generally to the target capture and processing field, and more specifically to new and useful compositions, methods, and systems for sample processing using morphology-adjustable functionalized particles.

BACKGROUND

With an increased interest in biological target capture and characterization, partitioning platforms that allow for isolation, identification, and/or retrieval of targets are becoming highly desirable. Such platforms can support applications of use involving target amplification (e.g., digital PCR) and characterization of spatial distributions of targets (e.g., with respect to spatial transcriptomics), by implementing functionalized compounds that are structured to capture target material for subsequent detection. However, such platforms often require complex workflows with manual steps prone to user error. Furthermore, such platforms provide limited control of reactions related to target capture, target release, and target retrieval. Additionally, compositions of materials can be improved significantly for applications involving capture and retrieval of target material in a manner that allows for analysis of single cells, material derived from single cells, and/or other targets from biological samples. As such, these processes require extensive and iterative manual library preparation and selection processes, may not amenable to automation, and may thus result high background noise rates, elevated false positive rates, or otherwise unreliable experimental results.

Thus, there is a need in the target capture and processing field to create new approaches to target capture, release, and/or detection. The invention(s) described herein cover new and useful compositions, methods, and systems for sample processing using morphology-adjustable functionalized particles.

BRIEF DESCRIPTION OF THE FIGURES

FIG. 3 depicts examples of steps for reconstituting particles to produce one or more morphological states suitable for sample processing and retrieval.

FIG. 7 depicts example results of sequencing processes performed using morphology-adjustable functionalized particles.

FIGS. 9A and 9B depict variations of using morphology-adjustable functionalized particles as semi-permeable membranes.

DESCRIPTION OF THE PREFERRED EMBODIMENTS

Figure 1A:
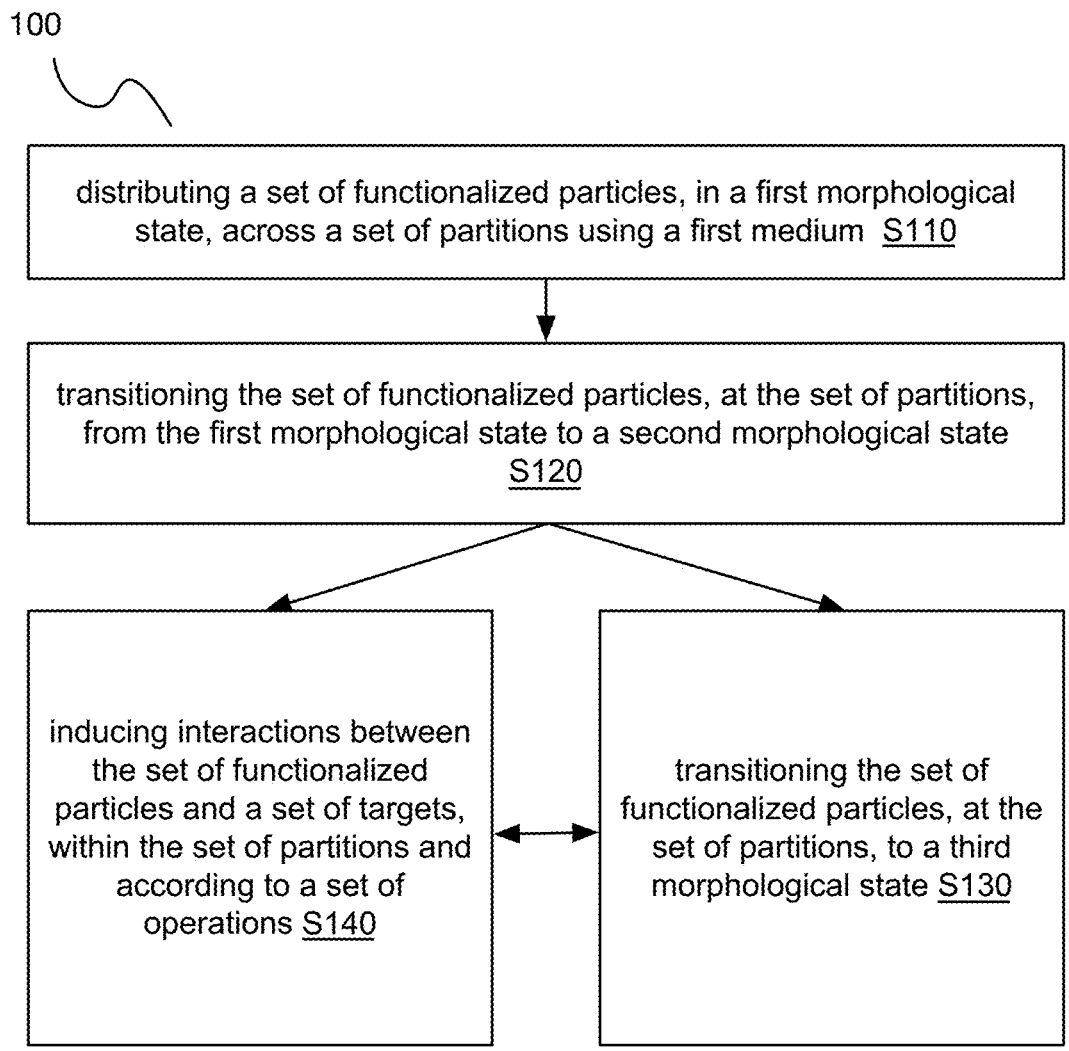
FIG. 1A depicts a schematic of an embodiment of a method for sample processing with morphology-adjustable functionalized particles.

The following description of the preferred embodiments of the invention is not intended to limit the invention to these preferred embodiments, but rather to enable any person skilled in the art to make and use this invention.

1. BENEFITS

The invention(s) described can confer several benefits over conventional systems, methods, and compositions.

In particular, the inventions provide morphology-tunable functionalized particles that can be used for pre-loading of microwell substrates and/or other substrates, thereby providing a higher degree of efficiency in relation to distribution (e.g., in a manner that requires fewer particles overall, such as 50% or less than current methods for particle loading of partitions, to achieve desired distributions of particles across partitions), and contributing to less material waste. In a specific example, the methods described can distribute particles across wells (e.g., microwells) of a substrate with use of ~50% fewer particles in comparison to methods of distribution where particles are loaded within wells in contemporaneously with sample distribution to the set of wells, to achieve an approximately 1:1 distribution of particles to wells. Alternatively, the invention(s) described can achieve another desired controlled distribution of particles to wells (e.g., less than 1 particle per well on average, 2 particles per well, 3 particles per well, etc.).

Alternatively, the invention(s) can be used to pre-load microwell substrates with particles in a desired pattern. For instance, the microwell substrate can be pre-loaded with a first particle type (e.g., configured to process a first type of target of a sample) in a first pattern or at a first subregion of the microwell substrate, and with a second particle type (e.g., configured to process a second type of target of the sample) in a second pattern or at a first subregion of the microwell substrate, such that distinct target types of the sample can be differentially captured, processed, and/or detected based upon the predetermined first pattern, second pattern, first subregion, or second subregion of the microwell substrate.

Relatedly, the inventions also provide improved methods for enabling co-capture of functionalized particles with target material (e.g., single cells, nucleic acids, nucleic acid fragments, proteins, small molecules, other analytes, etc.) in a one-to-one manner. As such, where the set of targets include nucleic acids of a set of single cells of the sample and where the set of partitions includes a set of microwells, the methods described can involve co-capturing the set of single cells with the set of functionalized particles within the set of partitions (e.g., with the set of functionalized particles in a second morphological state).

Still relatedly, the inventions provide improved methods for distributing/pre-loading functionalized particles across a distribution of partitions (e.g., microwell plate, other substrate, etc.), in a manner that results in higher efficiency of one particle per partition.

The inventions further enable applications related to adjusting morphology (e.g., sizes, shapes) of functionalized particles for target capture during loading onto a substrate, storage (e.g., with drying of particles), transportation, sample processing, and release from the substrate, in a highly controlled and on-demand manner. In some embodiments the desired organizational structure is achieved in a self-assembling manner due to the morphology. In relation to storage, the inventions can improve processes in a manner that provides better shelf life of components prior to use. The inventions can also reduce manufacturing burden in relation to usage and storage of materials and improve target capture workflows. In relation to drying and rehydrating of particles, the inventions further provide non-intuitive results in relation to initial and final morphologies of particles, thus enabling new highly-controllable applications of use.

In one use case, particles are loaded in a dehydrated state and then hydrated with desired osmolarity parameters in coordination with use of the substrate for sample processing, where hydrated particles are larger in diameter than their respective microwells. By tuning the size according to level of hydration and/or osmolarity, the particles may shrink to the point where they enter the microwell. The shrunken particle size may be such that only one bead can fit per microwell. Furthermore, upon hydration with desired osmolarity parameters, the particles may swell to seal off their respective microwells, and/or swell to push contents out of microwells for washing (e.g., in the context of waste material), and/or downstream retrieval and processing (e.g., in scenarios were targets of a sample are loaded above particles within microwells).

In another use case, the height of the microwell is identical/equal to the diameter (or other characteristic dimension) of the loaded particle (e.g., in a first morphological state). Further shrinking the loaded particle based upon environmental parameters (e.g., hydration, osmolarity, electric field, pH, temperature, etc.) can provide a volume for the loading of a substrate, i.e. a cell.

In another use case, the particle is designed to dissolve (e.g., transition to a fourth morphological state) upon the addition of an exogenous agent. For example the particle can comprise N,N'-Bis(acryloyl)cystamine, which dissolves when reacted with reducing agents such as DTT or TCEP.

In an exemplary use case where a dissolvable hydrogel is used for particle composition, the particle can be dried after loading. When loading a substrate such as a cell, the dissolving agent can be added such that upon rehydration the particle dissolves and thereby occupies a reduced or otherwise negligible amount of an internal volume of the microwell, thus allowing for the occupancy of the microwell by the substrate (e.g., a cell, another target).

The invention enables quality control in relation to the nature of loading particles within microwells of a substrate, since shrinking and/or drying the particles will reduce the physical overlap of one particle with another, thereby allowing single unit particle detection through imaging. Distinct boundaries between particles, for instance, can improve computational performance when imaging and/or otherwise detecting signals from contents of microwells.

In particular, the inventions can enable efficient methods for releasing particles from microwells and/or other substrate on-demand and in a rapid manner. Release and retrieval are typically difficult and non-efficient when using particles in high-aspect wells, due to close packing of wells of capture platforms. The ability to control workflow steps in which particles are retained within in partitions and workflow steps in which the particles (and attached content) are either removed or transitioned to another morphological state enables drastically improved workflows. Retrieval mechanisms described in relation to morphology-adjustable particles also subject target material to acceptable amounts of shear and other potential stresses that would otherwise obstruct downstream processing steps.

In specific applications, the inventions can be applied to partitions for digital PCR, other amplification assays, and/or other assays involving target capture and synthesis.

In specific applications, the inventions can be used to characterize spatial distributions of targets of a biological sample. For instance, controlled states of swelling of morphology-adjustable particles from addressable microwells can be used in the context of spatial transcriptomics, where, decoding positions of functionalized particles and captured targets (e.g., through sequencing) can be used to create spatial maps of captured targets. In one exemplary use case, particles can be loaded within microwells in a shrunken state, transitioned to a state in which they protrude from their respective microwells (or are otherwise able to contact sample material) by hydration with desired osmolarity factors, and interacting the substrate with a sample (e.g., tissue sample) with the particles can be used to determine relative spatial positions of targets of the tissue sample (e.g., single cells, single cell subtypes, proteins, nucleic acids such as RNAs and DNAs, other biomarkers).

The invention(s) confer(s) the benefit of providing non-naturally occurring compositions for facilitating capture, extraction, and/or retrieval of target biological material from a sample, while providing barcoding for each biomarker molecule retrieved from a partition of a sample. Barcoding and/or known addresses enable detection of particle positions, and thus, captured target positions, upon retrieving and sequencing processed genetic complexes generated using the particles. Furthermore, the invention(s) relate to combinations of materials, where the combinations of materials are non-naturally occurring (e.g., there is no naturally occurring counterpart to the compositions described and claimed).

The invention(s) also confer(s) the benefit of increasing the efficiency at which target material is retrieved (and non-target material is not retrieved). Selective retrieval efficiency can thus reduce downstream costs in relation to processing reagent and other material costs (due to reduced volumes needed), processing burden, and improved signal to noise ratios. In one example use case, osmotic pressure-induced swelling is proportional to charge of the particle; thus, particles without captured target material may swell less and thus remain in partitions, while particles with captured target material may swell more and thus become enriched in the population of particles released from partitions during downstream processing steps. As such, methods described can include: distributing a set of functionalized particles, in a first morphological state, across a set of partitions; co-capturing a set of targets of a sample with a first subset of functionalized particles; transitioning the first subset of the set of functionalized particles to a second morphological state (e.g., from the first morphological state, from a state intermediate to the first morphological state and the second morphological state, etc.) and a second subset of the set of functionalized particles (that have not captured targets of the sample) to a third morphological state (e.g., from the first morphological state, from a state intermediate to the first morphological state and the third morphological state, etc.) using a medium, where particles in the second morphological state have a higher degree of swelling in comparison to particles in the third morphological state; and preferentially releasing particles of the first subset from the set of partitions.

Alternatively, in a scenario where it is preferred to release particles that have no associated captured targets, methods described can include: distributing a set of functionalized particles, in a first morphological state, across a set of partitions; co-capturing a set of targets of a sample with a first subset of functionalized particles; transitioning the first subset of the set of functionalized particles to a second morphological state (e.g., from the first morphological state, from a state intermediate to the first morphological state and the second morphological state, etc.) and a second subset of the set of functionalized particles (that have not captured targets of the sample) to a third morphological state (e.g., from the first morphological state, from a state intermediate to the first morphological state and the third morphological state, etc.) using a medium, where particles in the second morphological state have a lower degree of swelling in comparison to particles in the third morphological state and remain within the set of partitions; and preferentially releasing particles of the second subset from the set of partitions.

The invention(s) also confer the benefit of enabling at least partial automation of the protocols involved in target capture (e.g., single cell capture), sample waste removal, target material retrieval, and subsequent processing. For instance, a human operator user can be removed from part or all of the method. For example, tunable particles can be loaded and dried during consumable manufacturing, removing this process from the user workflow, and facilitating the automation of downstream steps. Furthermore, the system(s) and/or method(s) can enable better accuracy in performance of a protocol over conventional systems and methods. Some of these inventions are also much more amenable to full automation with a liquid handling robot.

Additionally or alternatively, the invention(s) can confer any other suitable benefit.

2. METHODS FOR ADJUSTING MORPHOLOGY OF FUNCTIONALIZED PARTICLES AND APPLICATIONS OF USE

As shown in FIG. 1A, an embodiment of a method 100 includes: distributing a set of functionalized particles, in a first morphological state, across a set of partitions using a first medium S110; transitioning the set of functionalized particles, at the set of partitions, from the first morphological state to a second morphological state S120; and processing the set of partitions with one or more of a set of process fluids, thereby transitioning the set of functionalized particles, at the set of partitions, from the second morphological state to a third morphological state (e.g., using a second medium) S130.

In variations, the method 100 can further include inducing interactions between the set of functionalized particles and a set of targets, within the set of partitions and according to a set of operations with a set of process fluids S140, where step S140 can be performed prior to step S130, after step S130, or otherwise contemporaneously with (e.g., simultaneously with delivery of process fluids, near in time to delivery of process fluids, etc.) step S130.

Figure 1B:
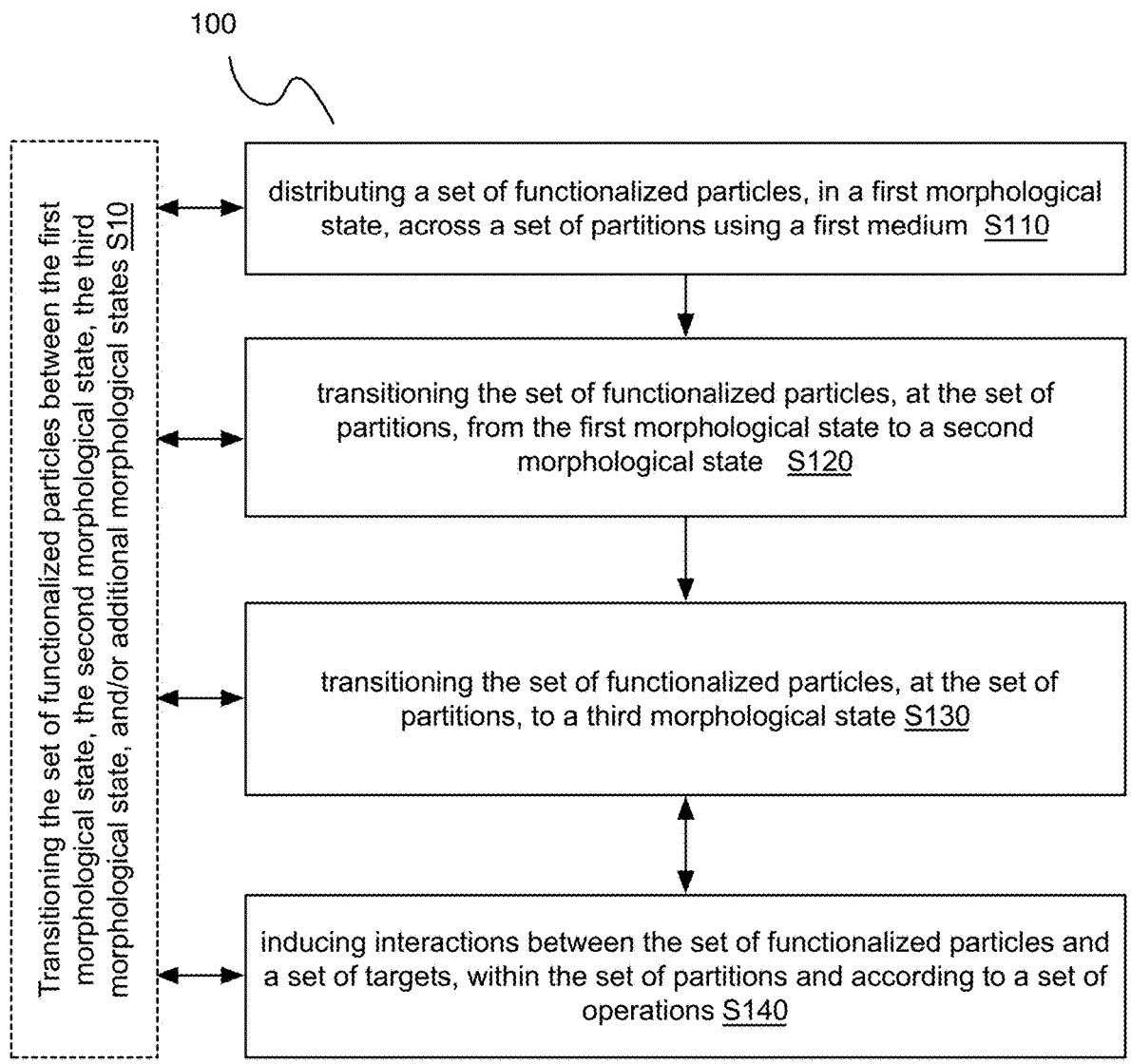
FIG. 1B depicts a schematic of a variation of a method for sample processing with morphology-adjustable functionalized particles.

In still other variations, as shown in FIG. 1B, the method 100 can further include transitioning the set of functionalized particles between the first morphological state, the second morphological state, the third morphological state, and/or additional morphological states S10, where, different states of functionalized particles are described in more detail below. As such, the method 100 can include coverage of transitions between different states (e.g., less than three states, more than three states, etc.) to provide functionality during various assays and/or steps of processing a sample.

The method 100 functions to implement and manipulate morphology-tunable functionalized particles, on-demand, in order to enable novel and non-obvious means for processing and characterizing targets from a sample. The method 100 can further be used for pre-loading of microwell substrates and/or other substrates in a manner that uses fewer functionalized particles, thereby providing a higher degree of efficiency in relation to distribution, and contributing to less material waste. In a specific example, the methods described can distribute particles across wells (e.g., microwells) of a substrate with use of ~50% fewer particles in comparison to methods of distribution where particles are loaded within wells in contemporaneously with sample distribution to the set of wells, to achieve an approximately 1:1 distribution of particles to wells. Alternatively, the methods described can achieve another desired controlled distribution of particles to wells (e.g., less than 1 particle per well on average, 2 particles per well, 3 particles per well, etc.). The method 100 also enables co-capture of functionalized particles with target material (e.g., single cells), with improved processes that also provide better shelf life of components prior to use. The method 100 further provides non-intuitive results in relation to initial and final tuned morphologies of particles, thus enabling new highly-controllable applications of use.

In one use case, on-demand tuning of particle morphology/size can provide adjustable volumes (e.g., larger volumes, smaller volumes) for reactions to occur within a microwell containing a target (e.g., cell, cell-derived material, nucleic acid, protein, analyte, etc.) and a particle. Additionally, in a non-intuitive and non-obvious manner, initial distribution of particles (having a first morphological size) across a set of partitions using a medium, drying the distribution of particles within the partitions, and later reconstitution of the distribution of particles within the partitions in the same medium can produce particles larger than the first morphological size, which can facilitate release of particles from partitions in an efficient manner (e.g., where swelling causes particles to push out of microwells), along with other applications. Release and retrieval are typically difficult and non-efficient when using particles in high-aspect wells, due to close packing of wells of capture platforms; thus, the methods provide utility in a non-intuitive manner. Furthermore, addition of other process reagents during reconstitution can be used to control equilibrium particle morphology within a partition, with corresponding applications of use.

The methods described can be performed in arrays of wells (e.g., microwells, nanowells, nanovials, etc.), fluidic systems (e.g., including channels, chambers, other fluidic structures, etc.), tubes, or other suitable fluid containers. Additionally or alternatively, the methods described can be performed using substrates (e.g., slides, plates, other substrates) upon which functionalized particles can be applied (e.g., in droplet or spotted format). Additionally or alternatively, the methods described can be performed within other droplets or partitions (e.g., in the context of digital PCR or other partitioning) applications.

In one non-limiting example, the particles can be arrayed on a planar surface (e.g., a slide) in an enlarged state, where in the enlarged state, the particles self-arrange in a close packed array (e.g., hexagonal close packed array, rectangular close packed array). Subsequent attachment of the particles to the surface and decreasing the particle size results in effectively partitioning each of the particles (e.g., by creating an empty space between adjacent particles). Particles can subsequently be further separated by using air, oil, or other materials to fill the spaces between particles that arose due to the size change. As such, distributing the set of functionalized particles, in a first morphological state, can include distributing the set of functionalized particles in an enlarged state, and the method can further include: transitioning the set of functionalized particles from the enlarged state to a reduced state upon shrinking each of the set of functionalized particles (e.g., by dehydration, by an osmotic shift, etc.); and partitioning each of the set of functionalized particles from each other (e.g., based upon such shrinkage and/or with a filler medium positioned within empty spaces between adjacent particles of the set of functionalized particles.

The methods described can be implemented using embodiments, variations, and examples of system and microfluidic substrate components described in one or more of: U.S. Publication number 2018/0364148 filed 27 Jul. 2018; U.S. Publication number 2019/0144931 filed 30 Jul. 2018; U.S. Pat. No. 9,925,538 granted 27 Mar. 2018; U.S. Pat. No. 10,509,022 granted 17 Dec. 2019; U.S. Pat. No. 10,533,229 granted 14 Jan. 2020; U.S. Pat. No. 10,350,601 granted 16 Jul. 2019; U.S. Pat. No. 10,449,543 granted 22 Oct. 2019; U.S. Pat. No. 10,466,160 granted 5 Nov. 2019; U.S. Pat. No. 10,391,493 granted 27 Aug. 2019, U.S. Pat. No. 10,633,693 granted 28 Apr. 2020; and U.S. application Ser. No. 16/816,817, filed 12 Mar. 2020, which are each incorporated in their entirety by this reference.

Embodiments, variations, and examples of compositions of particles are described in Section 3 below, and in U.S. application Ser. No. 17/109,704 filed on 2 Dec. 2020, which is herein incorporated in its entirety by this reference.

2.1 Method—Distributing Functionalized Particles Across Partitions

Step S110 recites: distributing a set of functionalized particles, in a first morphological state (e.g., a first state of swelling), across a set of partitions using a first medium (e.g., during reconstitution of functionalized particles), which functions to load the functionalized particles into partitions and/or onto a substrate in an efficient manner.

The set of partitions can include wells (e.g., microwells, nanowells) distributed across a substrate (e.g., plate, cartridge, chip, slide, etc.), where such wells can include a base surface, one or more walls extending from the base surface to define a chamber volume, and an open surface (which can be closed or other wise covered during stages of use). In variations, the chamber volume can have a length, a width, and a depth, where the length (or diameter) can vary from 1-50 microns, 1-60 microns, 1-70 microns, or greater. The width (or diameter) can vary from 1-50 microns, 1-60 microns, 1-70 microns, or greater. The depth can vary from 1-80 microns, 1-90 microns, 1-100 microns, 1-200 microns, or deeper; however, in other variations, the chamber volume can have other suitable ranges of characteristic dimensions. Additionally or alternatively, thicknesses of walls separating adjacent wells of the set of partitions can be 0.1 to 1 microns thick, 0.1 to 2 microns thick, 0.1 to 3 microns thick, or another suitable thickness. Furthermore, where a range of values is provided, it is understood that each intervening value, between the upper and lower limit of that range and any other stated or intervening value in that stated range is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either both of those included limits are also included in the invention, as described here and throughout this disclosure.

In examples the depth (or other characteristic of the chamber volume) can be configured to accommodate a target material component (e.g., cell, tissue structure, protein, nucleic acid, other analyte) of the sample and a functionalized particle in a morphological state associated with sample processing. Alternatively, the chamber volume can be sized smaller than a combined volume of the target material component and the functionalized particle, in relation to morphology-adjustable particles and morphological states of such particles (e.g., in relation to particle loading modes, particle release modes, etc.).

In more detail with respect to different variations, in one use case, hydrated particles (e.g., particles in a third morphological state) are in a third state of swelling and have diameters larger in diameter than the microwell diameter of the set of partitions. By tuning size, particles hydrated with a first medium and then shrunk (e.g., with use of a medium, with dehydration, etc.), may shrink to the point where they enter the microwell. The shrunken particle size may be such that only one particle can fit within microwell. As such, distributing particles in a swollen state, followed by shrinking, can improve the efficiency of having a 1:1 ratio of particles to wells, without needing redistribution of particles (e.g., with flow to dislodge any additional particles beyond a first particle within a well). In another use case, the height of the microwell is identical to the height of the loaded particle in a first morphological state. Method steps involving shrinking or further shrinking the loaded particle (e.g., with a second medium providing an osmotic shift, with dehydration, etc.) to a second morphological state can provide a volume for the loading of a substrate (e.g., a cell) within the well given the increased well capacity for additional contents due to the second morphological state of the particle. As such, the second morphological state can be a second state of swelling, in which the set of functionalized particles are dehydrated and have a second size smaller than the first size of particles in the first morphological state.

In another use case, the particle is designed to dissolve upon the addition of an exogenous agent. As such, variations of the method 100 can include transitioning the set of functionalized particles to a fourth morphological state in which the set of functionalized particles are dissolved with an exogenous agent. In one example, the particle can comprise N,N'-Bis(acryloyl)cystamine, which dissolves when reacted with reducing agents such as DTT or TCEP. In the use case where a dissolvable hydrogel is used, the particle can be dried after loading. When loading a substrate such as a cell, the dissolving agent can be added such that upon rehydration, the particle dissolves and occupies no or negligible space of the respective well, thus allowing for the occupancy of the microwell by the substrate (e.g., a cell).

In examples where the target material component is a cell, the chamber volume can have a height or other characteristic that is as tall or taller than a combined height of the cell and the functionalized particle (e.g., in a reconstituted state).

Alternatively, the chamber volume can have a height or other characteristic that is less than (e.g., half, less than half, less than by another factor) a combined height of the cell and the functionalized particle. Examples of use and sample processing in which the chamber volume has a height or other characteristic that is less than a combined height of the cell and the functionalized particle can thus be implemented, in relation to initial delivery, drying, and reconstitution of functionalized particles, and processing of functionalized particles with target sample material. For instance, equilibrium states of functionalized particles can be tuned, on-demand, in a manner that produces particle sizes that remain stably smaller than their maximum swollen sizes, to allow for use of microwells having heights smaller than a combined height of a single cell and a single full-sized functionalized particle. In another example, shrunken and/or dried particles can be dissolved when loading the cell such that the particle no longer occupies volume in the partition (e.g., microwell), thereby enabling loading of the cell and/or preventing displacement of the cell by the particle during cell loading. Similarly, the particles can be deliberately sized and/or shaped to allow loading of only 1 target (e.g., 1 cell or 1 nucleus) per partition at loading, but then optionally shrunken or dissolved for subsequent steps; particles may be either smaller, larger, or the same size in prior or later workflow steps. By use of microwells having smaller heights, overloading of microwells with cells, functionalized particles, and/or other materials can be avoided, enabling loading of the partition (e.g., microwell) with only one cell (or other target) and/or functionalized particle.

Distributing the set of functionalized particles can be performed using a fluid handling system with liquid aspiration and delivery components, involving automated distribution apparatuses, where embodiments, variations, and examples of components are described in Patent Applications, Publications, and Issued Patents incorporated by reference. Additionally or alternatively, distributing the set of functionalized particles can be performed manually, with fluid delivery components (e.g., pumps, syringes, etc.) structured for handling of functionalized particles (e.g., in solution, in another medium).

Embodiments, variations, and examples of well systems and processing platforms are described in one or more of: U.S. Publication number 2018/0364148 filed 27 Jul. 2018; U.S. Publication number 2019/0144931 filed 30 Jul. 2018; U.S. Pat. No. 9,925,538 granted 27 Mar. 2018; U.S. Pat. No. 10,509,022 granted 17 Dec. 2019; U.S. Pat. No. 10,533,229 granted 14 Jan. 2020; U.S. Pat. No. 10,350,601 granted 16 Jul. 2019; U.S. Pat. No. 10,449,543 granted 22 Oct. 2019; U.S. Pat. No. 10,466,160 granted 5 Nov. 2019; U.S. Pat. No. 10,391,493 granted 27 Aug. 2019, U.S. Pat. No. 10,633,693 granted 28 Apr. 2020; and U.S. application Ser. No. 16/816,817, filed 12 Mar. 2020, which are each incorporated in their entirety by reference above.

While wells are described, distribution in Step S110 can be performed across surfaces or within partitions not involving wells. For instance, the set of particles can be distributed across recesses (e.g., dimples) on a substrate, between protrusions (e.g., bumps) on a substrate, as spots or droplets on a substrate (e.g., with markers or fiducials to provide separation), within droplets, and/or in another suitable format. As such, the distribution can be in a pattern (e.g., governed by an array of recesses or wells) and/or in a packed configuration (e.g., hexagonal close packed configuration, other close packed configuration). Additionally or alternatively, the distribution can be non-uniform and/or in a non-packed configuration.

Distribution in Step S110 can also occur using a sol-gel solution such that when tunable particles in the sol-gel solution are distributed, the sol-gel solution is solidified. In some cases, the solidified sol-gel matrix is not sensitive to the particle size tuning agents. For instance, distributing the set of functionalized particles can be performed by printing particles (e.g., in droplet format) using a liquid ink composition of particle material, where, upon deposition at a surface or within microwells, the liquid ink can be cross-linked to form solid bodies of the functionalized particles.

Distribution of the set of functionalized particles can include one or more of: priming the substrate (e.g., wells of the substrate) or container associated with the partitions, incubating the set of functionalized particles to prepare them for distribution and/or for storage, washing the set of functionalized particles (e.g., in one or more stages), aliquoting a desired number or volume of functionalized particles for distribution across partitions, constituting or reconstituting (e.g., from a non-constituted state) the set of functionalized particles using a first medium, depositing the set of functionalized particles across the partitions of the substrate or container, and/or performing other suitable steps. Preparation and distribution can be performed using apparatuses as described, and/or using deposition apparatus, some variations of which are described further below.

In variations, priming can include priming in ethanol (e.g., 100% ethanol, 90% ethanol, 70% ethanol, etc.) and/or another suitable priming medium, in order to prepare the substrate or container(s) for receiving the distribution of functionalized particles.

In variations, incubating can include incubating the set of functionalized particles in an incubation medium (e.g., water, another suitable medium) at a desired temperature (e.g., from 10-37° C., at another suitable temperature or temperature profiles), and for a desired duration of time (e.g., from 1-90 minutes, for less than 1 minute, for longer than 90 minutes); however, in other variations, incubation can be performed in another suitable manner.

In variations, washing can include washing the distribution of functionalized particles in water with other additive components (e.g., pluronic F-98, salts, other suitable solutes, etc.), in one or more stages, and with removal of wash media in one or more stages. In examples, washing can be performed from 1 to 5 times, with removal of wash media between washes; however, washing can be performed any other suitable number of times. Additive components can be provided at a percentage of 0.05 to 1%, or another suitable percentage of wash media.

In variations, constituting or reconstituting in the first medium can include constituting/reconstituting in one or more of: water, saline (e.g., phosphate buffered saline, other saline), and/or other buffers. Reconstitution media can include an aqueous media (e.g., water, saline, phosphate buffered saline). Alternatively, reconstitution media can include non-aqueous components. Additionally or alternatively, constituting/reconstituting can be performed using media including polymer components that control the first morphological state of particles of the set of functionalized particles. For instance, reconstitution media can include media tuned to have a suitable density, viscosity, polymer size, polymer branching, refractive index, surfactant properties, or other suitable characteristic to control the first morphological state of particles of the set of functionalized particles in association with the initial distribution step. In examples, additional components affecting properties of reconstitution media can include one or more of: lauric acids, sorbitans, dimethicones, silicone polyether copolymers, hydrogenated polyisobutylene, lipophilic materials, polyethylene glycols (PEGs), iodixanols, polysaccharides, colloidal silica and/or other suitable components. In one variation, the first medium and second medium can each include an aqueous medium, and a process fluid of the set of process fluids used can include a polymer component configured to counteract osmotic swelling of the set of functionalized particles.

Initial reconstitution can produce particles that, in the first state, have a characteristic dimension from 0.5 to 100 micrometers in diameter. However, initial reconstitution can produce particles having other characteristic dimensions and/or other morphologies (e.g., non-spherical morphologies, tube morphologies, etc.). Furthermore, reconstitution can be performed in stages, such that the first medium includes multiple components that are delivered in sequence, to control arrival of the set of particles at the first morphological state. In one such variation, a first component of the first medium can prime the set of functionalized particles for exposure to a second component (and/or third component, fourth component, etc.) of the first medium, to produce particles that are characterized by the first morphological state.

In variations, depositing can include flowing a solution of reconstituted particles over partitions at a substrate, and centrifuging the substrate with the solution of functionalized particles to uniformly distribute the functionalized particles into the partitions. In other variations, depositing can include one or more of: printing functionalized particles, dropcasting solutions of functionalized particles, impregnating (e.g., impregnating droplets with functionalized particles), pipetting functionalized particles as spots on a substrate, promoting gravity settling of functionalized particles into partitions, applying a magnetic field having a characteristic field pattern for attracting magnetic functionalized particles, applying an electric field having a characteristic field pattern for attracting magnetic functionalized particles or charged particles, and any other suitable deposition process. Additionally or alternatively, where partitions are not pre-defined by structures (e.g., as in microwell chips), depositing can include patterning a coupling layer (e.g., an adhesive layer) onto a base substrate (e.g., slide) by a process (e.g., a spraying process, a vapor deposition process, a spin-coating process, a printing process, etc.) to define regions intended for functionalized particles. Thereafter, depositing the functionalized particles onto the prepared substrate can include variations techniques described above, whereby the particles bond (in a permanent manner, in a reversable manner) with the regions of the coupling layer. In variations, where the particles are intended to be removable from a coupling layer, removal can be achieved with a suitable detergent or another reagent/mechanism.

Embodiments, variations, and examples of depositing particles are further described in patent applications, patent publications, and issued patents incorporated by reference above, as well as in U.S. Pat. No. 10,391,492 issued 27 Aug. 2019 and U.S. Pat. No. 10,633,693 issued 28 Apr. 2020, which are each incorporated in its entirety herein by this reference.

Figure 2A:
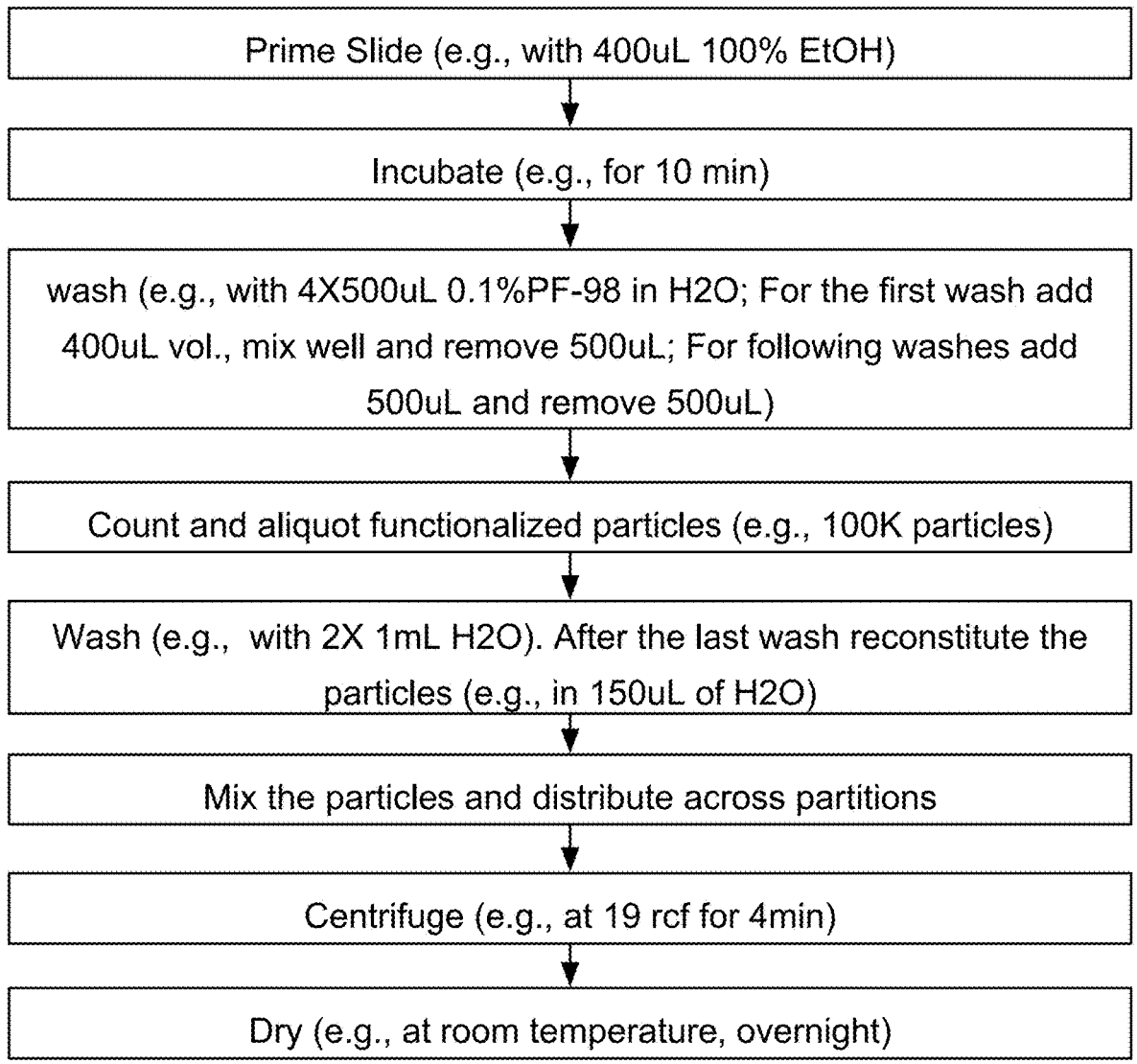
FIGS. 2A and 2B depict examples of steps for preparing and distributing particles across partitions.
Figure 2B:
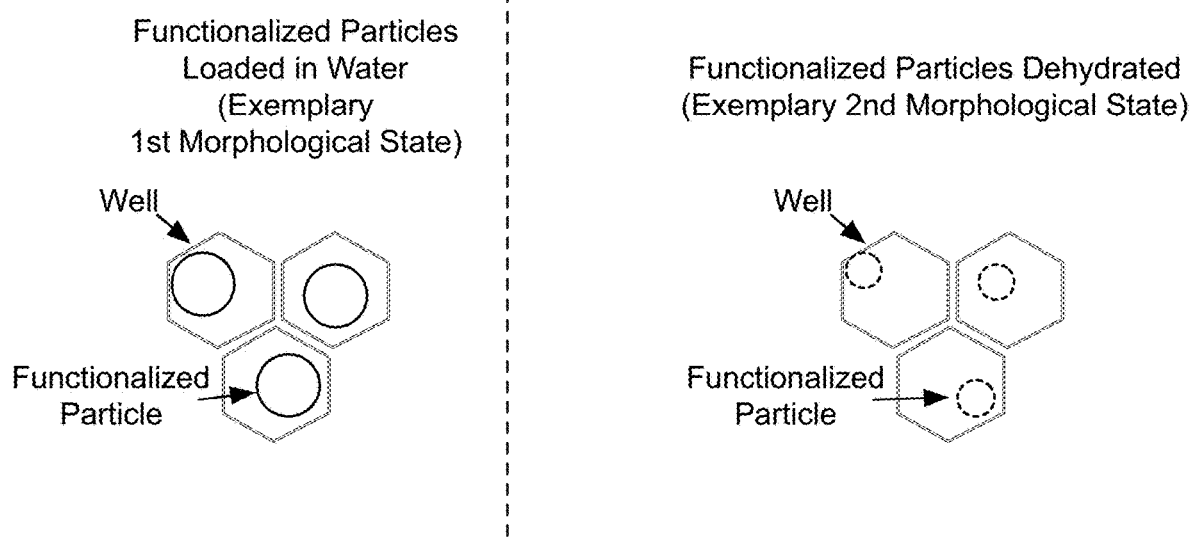

A specific example of step S110, as shown in FIGS. 2A and 2B, can include: priming a substrate having an array of microwells with a volume (e.g., 400 microliters, another suitable volume) of ethanol (e.g., 100% ethanol), followed by incubation for 10 minutes, followed by four stages of washing with a volume (e.g., 500 microliters, another suitable volume) of 0.1% PF-98 in water, with removal of wash media between washes. As shown in FIGS. 2A and 2B, the specific example can further include aliquoting a desired number (e.g., 100K, another suitable number) of functionalized particles, washing the number of functionalized particles (e.g., twice in 1 milliliter of water, another suitable number of times in another volume of wash media), followed by reconstitution in a reconstitution medium (e.g., in 150 microliters of water). In the specific example, deposition can include implementation of a fluid handling system to deliver the reconstituted functionalized particles onto a substrate defining the array of microwells, followed by centrifugation at 19 relative centrifugal force (ref) for 4 minutes. The example of step S110 produces reconstituted functionalized particles that are loaded into the microwells of the substrate in a uniform manner and without exhibiting salt residues.

Variations of the exemplary method described above can alternatively include priming the substrate having the array of microwells with less than 200 microliters, less than 300 microliters, less than 400 less than 500 microliters, less than 600 microliters, an intermediate volume, or a greater volume of priming solution. Variations of the exemplary method described above can alternatively include priming the substrate having the array of microwells with less than 100% ethanol. Variations of the exemplary method described above can include incubating the substrate for less than 5 minutes, less than 10 minutes, less than 15 minutes, or less than 20 minutes. Variations of the exemplary method described above can include less than 2 stages of washing, less than three stages of washing, less than 4 stages of washing, less than 5 stages of washing, or other washing protocols as necessary, with other constitutions of wash media (e.g., other percentages of PF-98) or other wash media. Variations of the exemplary method described above can include aliquoting 50K, 100K, 200K, 300K 400K, 500K, 600K, 700K, 900K, 1M, 2M, 3M, 4M, 5M, 6M, 7M, 8M, 9M, 10M, an intermediate number of functionalized particles, or another suitable number of functionalized particles (e.g., depending upon the number of microwells available at the substrate). Variations of the exemplary method described above can include washing and/or reconstituting the set of functionalized particles in another suitable volume of reconstitution medium. Variations of the exemplary method described above, with respect to deposition, can include implementation of a fluid handling system, printing system, other robotic apparatus, magnetic field, or other suitable mechanism to deliver the reconstituted functionalized particles onto a substrate defining the array of microwells. Variations of the exemplary method described above can include centrifugation at 14 ref, 15 ref, 16 ref, 17 ref, 18 ref, 19 rcf, 20 ref, or another suitable level of ref, and/or at a duration of 2 minutes, 3 minutes, 4 minutes, 5 minutes, 10 minutes, 15 minutes, etc to facilitate positioning of the functionalized particles within microwells.

In variations involving controlled distribution of the set of functionalized particles within microwells (e.g., with printing, with pick-and-place operations, etc.), variations of the methods described can achieve another desired controlled distribution of particles to wells (e.g., less than 1 particle per well on average, 2 particles per well, 3 particles per well, etc.). Alternatively, the methods can be used to pre-load microwell substrates with particles in a desired pattern. For instance, the microwell substrate can be pre-loaded with a first particle type (e.g., configured to process a first type of target of a sample) in a first pattern or at a first subregion of the microwell substrate, and with a second particle type (e.g., configured to process a second type of target of the sample) in Page 26 of 8 a second pattern or at a first subregion of the microwell substrate, such that distinct target types of the sample can be differentially captured, processed, and/or detected based upon the predetermined first pattern, second pattern, first subregion, or second subregion of the microwell substrate. The first subregion, second subregion, third region, and/or additional subregions can be ordered or otherwise random. In downstream applications, where the different subregions have functionalized particles with varied morphological states and/or varied transition mechanisms for different equilibrium morphological states, method steps can involve controlled staging of particle morphology transitions in relation to an assay being performed. For instance, where a first particle subtype changes (e.g., swells, shrinks, dissolves, folds, etc.) under first conditions and a second particle subtype changes (e.g., swells, shrinks, dissolves, folds, etc.) under second conditions, the method can include transitioning the first particle subtype to its second morphological state (e.g., involving release of the first particle subtype with a first set of captured targets of, for instance, a first cell type) from microwells with a high degree of selective efficiency (e.g., greater than 90%, greater than 95%, greater than 99%, etc.), followed by transitioning the second particle subtype to its second morphological state (e.g., involving release of the second particle subtype with a second set of captured targets for instance, of a second cell type) from microwells with a high degree of selective efficiency (e.g., greater than 90%, greater than 95%, greater than 99%, etc.).

However, variations of the specific example of step S110 can be implemented in another suitable manner.

2.2 Method—Transitioning Functionalized Particles to a Second Morphological State Step S120 recites: transitioning the set of functionalized particles, at the set of partitions, from the first morphological state to a second morphological state. The second morphological state can be a state in which particles of the set of functionalized particles are stabilized within the set of partitions (e.g., for storage, to produce desired shelf life characteristics, for shipment, for other movement or transportation, etc.). In particular, stabilization of the set of functionalized particles can retain positions of the set of functionalized particles within the partitions, even when a substrate or container associated with the set of partitions is transported. As described above, where multiple particle subtypes with different available morphological state transitions are involved, Step S120 can involve transitioning each subtype of the set of functionalized particles, at their respective regions of the set of partitions, to their respective second morphological states.

Additionally or alternatively, the second (or any later morphological state) can be a state in which structure or structural integrity of the set of functionalized particles is altered, such that reconstitution or re-hydration during use of the set of functionalized particles produces a third morphological state (as described in relation to Step S130 below) that is different than the first morphological state, even when using the same media for constitution/reconstitution as in Step S110. In examples, this was initially achieved as a beneficial byproduct of drying and rehydration, but similar results can be achieved by modification of the particles and/or by other suitable means. For example, particles composed of acrylamide monomers crosslinked with both bis acrylamide and BAC (N,N'-Bis(acryloyl)cystamine) will have reduced crosslinking after treatment with a reducing agent, and therefore can show different swelling properties in the same buffer system after reduction of the disulfide linkages. As such, treatment of particles in a first morphological state, with a reagent that adjusts or eliminates all or a portion of crosslinking of bodies the functionalized particles, can be used to produce a a third morphological state (as described in relation to Step S130 below) that is different than the first morphological state.

Additionally or alternatively, the bottom, (e.g., base surface), of a microwell can be configured to couple with a particle such that in all downstream morphological states, the particle remains loaded in the microwell. This attachment can be irreversible or reversible (e.g., using magnetic particles, using particles bonded in a manner that can be reversed with a detergent, using particles bonded in a manner that can be changed in response to an electric field, using particles bonded in a manner that can be changed in response to temperature, etc.).

Additionally or alternatively, the second morphological state can be a state in which the morphology of the set of functionalized particles is otherwise altered (e.g., with particle shrinking, with particle expansion, with structural folding, with inducing a shape memory state, etc.).

In one variation, transitioning the set of functionalized particles to the second morphological state can include drying the set of functionalized particles, within the set of partitions, where drying can be performed passively and/or actively. Passive drying can include drying within a drying environment (e.g., sterile environment, room temperature environment, etc.) without active heating of the set of functionalized particles, partitions, or associated substrates. Active drying can include drying within an altered drying environment having one or more of: a desired gas composition, a desired/low level of humidity, a set temperature (e.g., higher than room temperature), with provision of desiccants, providing convective heating, providing radiative heating, providing active sterilization (e.g., by heat sterilization, by flash sterilization, by ethylene oxide sterilization, by plasma sterilization, etc.), and/or other suitable characteristics. Additionally, active drying can include solvent exchange where aqueous solution is replaced with a non-aqueous solution whether in a single step or multiple steps (e.g., an alcohol dehydration series).

In variations, particles can be dried without any excipients (e.g., in deionized water) and in other variations, the particles may be dried in the presence of excipients which may provide beneficial attributes including: stability of the particles within the partitions (e.g., coupling the particles to partition/well surfaces), desired properties upon rehydration (e.g., with use of PEG or other reagents to control particle size), or desired properties in downstream steps or stability of the particles or associated molecules.

Transitioning the set of functionalized particles to the second morphological state can additionally or alternatively include affecting structure of the set of functionalized particles in another manner. For instance, transitioning in Step S120 can include one or more of: inducing crosslinking (e.g., by application of heat, by application of pressure, by inducing changes in pH, by photo crosslinking, by chemical crosslinking, etc.), removing crosslinks (e.g., by application of heat, by inducing changes in pH, by irradiation, by changing a chemical environment, by mechanical disruption, etc.), reducing structural integrity (e.g., with an acid, with a solvent, by freezing, by thawing, by repeated freeze-thaw cycles, by drying, by chemical reduction of crosslinkers, etc.), and/or affecting structure in another suitable manner.

In an example, as shown in FIG. 2B, dehydration of the set of functionalized particles within partitions, at room temperature for approximately 6-10 hours, produces particles that are ~⅔ the size of that of the first morphological state, that exhibit no salt residue, and that retain their positions within partitions, even when the substrate defining the well partitions is moved or transported. In variations of the exemplary method described, dehydration of the set of functionalized particles within partitions, can occur at temperatures warmer than room temperature, for less than 6 hours or greater than 10 hours, in order to achieve particles that are another suitable size in relation to sizes of particles in the first morphological state. However, variations of the example can be performed in another suitable manner.

2.3 Method—On-Demand Tuning of Morphological States of Functionalized Particles, in Coordination with Target Capture and Processing Step S130 recites: processing the set of partitions with one or more of a set of process fluids, thereby transitioning the set of functionalized particles, at the set of partitions, from the second morphological state to a third morphological state (e.g., third state of swelling). Step S130 functions to transition the set of functionalized particles, within their respective partitions, to a state ready to be used in sample processing for target capture, material synthesis, and/or characterization. Step S130 can additionally or alternatively function to provide a non-intuitive mechanism for releasing functionalized particles from their respective partitions on demand and/or for retrieval of target material captured from the sample when using the set of functionalized particles.

In variations, the third morphological state can be reconstituted state, hydrated state (e.g., in aqueous media), state associated with shape memory characteristics of the functionalized particle (e.g., due to environmental pH, due to environmental heat, due to environmental pressure, due to applied electric fields, due to aspects of surrounding media, etc.), a partially degraded state (e.g., such that a larger degree of swelling can occur, in comparison to the first morphological state), a fully degraded state (e.g., with compromise of structural integrity to release material, such as primers or other components attached to the particle matrix), or other state (e.g., in aqueous and/or non-aqueous media). The third morphological state can thus return functionalized particles to their same state (e.g., size, shape, etc.) as the first morphological state in Step S110, or a different state (e.g., size, shape, etc.) as the first morphological state in Step S110.

Non-intuitively, in examples, use of the same media (e.g., such that the first medium is identical to the second medium) used to constitute/reconstitute the functionalized particles in Step S110 transitions the functionalized particles to have a larger equilibrium size (i.e., as the third morphological state) than that of the first morphological state. As such, the third morphological state can be a third state of swelling in which the set of functionalized particles have a third size greater than the first size. Such properties can thus provide an on-demand mechanism for releasing functionalized particles, with or without associated material from a sample, from partitions for downstream retrieval and further applications. Furthermore, when different particle subtypes are involved, and each particle subtype can be individually released with a triggering stimulus (e.g., media change, etc.) such a configuration can provide an on-demand mechanism for releasing subsets of functionalized particles (e.g., with different captured targets) sequentially or in stages, with a high degree of efficiency, as described above. As further described below, use of various media and/or environmental conditions can otherwise produce different equilibrium particle states as the third morphological state. Additional properties and applications are further described below.

Transitioning the set of functionalized particles to the third morphological state can include one or more of: priming the substrate (e.g., wells of the substrate) or container associated with the partitions, incubating the set of functionalized particles to prepare them for distribution and/or for storage, washing the set of functionalized particles (e.g., in one or more stages, with one or more different types of wash media), providing various environmental conditions for the set of functionalized particles in coordination with stages of sample processing, and/or performing other suitable steps. Delivery or reception of different process fluids of the set of process fluids can be performed using apparatuses as described, and/or using deposition apparatus, some variations of which are described further below.

In variations, priming can include priming in ethanol (e.g., 100% ethanol, 90% ethanol, 70% ethanol, etc.) and/or another suitable priming medium, in order to prepare the substrate or container(s) for receiving the distribution of functionalized particles.

In variations, incubating can include incubating the set of functionalized particles in an incubation medium (e.g., water, another suitable medium) at a desired temperature (e.g., from 10-37° C., at another suitable temperature or temperature profiles), and for a desired duration of time (e.g., from 1-90 minutes, for less than 1 minute, for longer than 90 minutes); however, in other variations, incubation can be performed in another suitable manner. Incubation can additionally or alternatively be performed in coordination with incubation steps (e.g., incubation related to cell lysis, incubation related to cell culture, incubation related to enzymatic processes, etc.) for an assay being performed with the set of functionalized particles.

In variations, washing can include washing the distribution of functionalized particles in water with other additive components (e.g., polyethylene glycol, other polymer solutions, salts, other suitable solutes, etc.), in one or more stages, and with removal of wash media in one or more stages. In examples, washing can be performed from 1 to 5 times, with removal of wash media between washes, and using mixtures of PEGs in saline (e.g., 15% PEG6000 in 1× phosphate buffered saline, other mixtures); however, washing can be performed any other suitable number of times. Additive components can be provided at a percentage of 0.05 to 20%, or another suitable percentage of wash media. In particular, washing with media including polymer solutions or other solutions be used to control equilibrium swelling point(s) for the functionalized particles and/or control states in other suitable manners.

Additionally or alternatively, washing media and/or reconstitution media can include non-aqueous components. Additionally or alternatively, washing media can be performed using media including polymer components that control the third morphological state of particles of the set of functionalized particles, by countering osmotic pressure-induced swelling of particles. For instance, media can include components tuned to have a suitable density, viscosity, polymer size (e.g., molecular weight, branching characteristics), polymer branching, surfactant properties, or other suitable characteristic to control the third morphological state of particles of the set of functionalized particles at equilibrium. In examples, additional components affecting properties of reconstitution media can include one or more of: lauric acids, sorbitans, dimethicones, silicone polyether copolymers, hydrogenated polyisobutylene, lipophilic materials, polyethylene glycols (PEGs), iodixanols, polysaccharides, colloidal silica, and/or other suitable components. Additionally or alternatively, salts can be provided with wash and/or reconstitution media, in order to affect charge of the environment surrounding the set of functionalized particles, thereby affecting equilibrium swelling state.

Washing/reconstitution can produce particles that, in the third morphological state, have a characteristic dimension from 0.5 to 100 micrometers in diameter. However, washing/reconstitution can produce particles having other characteristic dimensions and/or other morphologies (e.g., non-spherical morphologies, tube morphologies, morphologies involving split bodies, morphologies involving wrinkled surfaces, morphologies involving larger pore sizes, etc.).

A specific example of step S130, as shown in FIG. 3, can include: priming the substrate having the functionalized particles, stored in the second morphological state, with a volume (e.g., 400 microliters, another suitable volume) of ethanol (e.g., 100% ethanol), followed by incubation for 10 minutes, followed by multiple stages of washing with a volume (e.g., 500 microliters, another suitable volume) of 15% PEG6000 in 1×PBS, with removal of wash media between washes. The specific example can be performed multiple times, and/or with variations (e.g., in volume and percentage of ethanol, number of wash steps and wash medium, and application of a stabilizing medium, other variations of which steps are described above). As shown in FIG. 3, the specific example of Step S130 provides functionalized particles, within the set of partitions, that swell to an equilibrium state in which additional sample materials (e.g., cells, nucleic acids, proteins, other material) can be distributed to the partitions, in order to interact with functionalized components of the set of functionalized particles.

Figure 4:
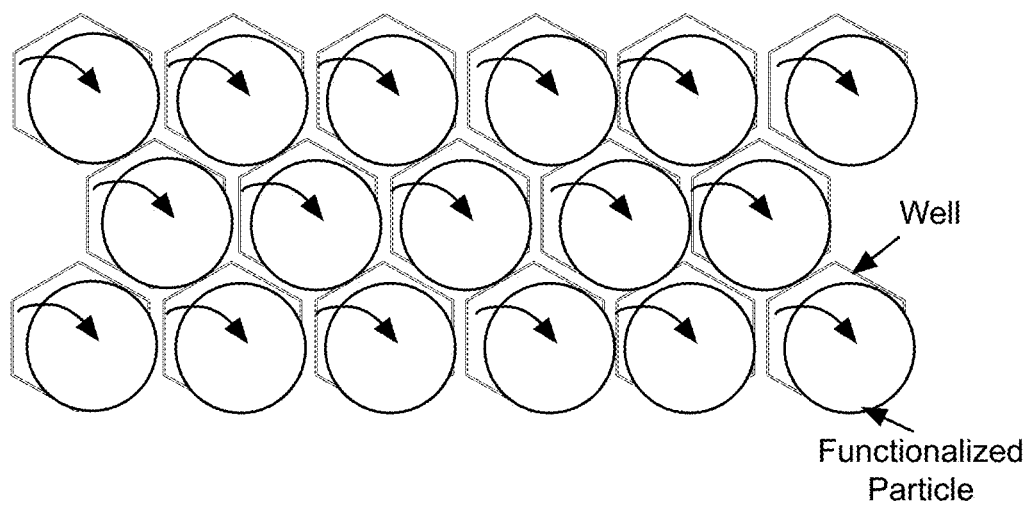
FIG. 4 depicts examples of steps for producing one or more morphological states suitable for particle swelling and retrieval.

In another specific example, as shown in FIG. 4, reconstitution with saline (e.g., 1×PBS), as used in examples to initially reconstitute functionalized particles in coordination with distribution across partitions, induces swelling of functionalized particles to a larger equilibrium state than the first morphological state, in a non-intuitive manner. As such, the specific example shown in FIG. 4 can provide an on-demand mechanism for swelling and release of functionalized particles from partitions (e.g., such that functionalized particles swell and float away from partitions, for downstream retrieval of functionalized particles, with target materials, for further analysis/processing. In the specific example, functionalized particles that are initially ~20 micrometers in diameter in PBS swell to 25 micrometers in diameter, upon rehydration with PBS in Step S130 (where PBS was also used as the first medium in earlier stages). Variations of starting and rehydration media can also be implemented, to achieve different degrees of subsequent swelling in comparison to initial states in the same medium. As such, particles can swell to a size (in the third morphological state) that is 15% greater than the first morphological state, 20% greater than the first morphological state, 25% greater than the first morphological state, 30% greater than the first morphological state, 40% greater than the first morphological state, an intermediate percentage, or another percentage greater than the first morphological state.

As such, in variations where the set of partitions include a set of microwells, transitioning the set of functionalized particles to the third morphological state can include releasing the set of functionalized particles from the set of microwells by inducing swelling in response to the second medium (or another medium).

In other examples, reconstitution with applied environmental conditions (e.g., pH conditions, temperature conditions, electric field conditions, pressure conditions, enzymatic conditions to affect cross-linking, irradiation conditions, magnetic field conditions, etc.) can produce third morphological states, states bypassing the third morphological states, or optionally, subsequent morphological states, associated with equilibrium shape memory states under various environmental conditions. Such third morphological states can include folded states, unfolded states, states producing motility, geometric or volumetric configurations, states of reduced structural integrity, and/or other states.

However, embodiments, variations, and examples of Step S130 can be performed in other suitable manners.

Furthermore, in relation to Step S10 and/or other steps associated with various morphological states shown in FIGS. 1A and 1B, different functional modes can be provided, by controlling morphology of the functional particles in an on-demand manner.

Figure 5A:
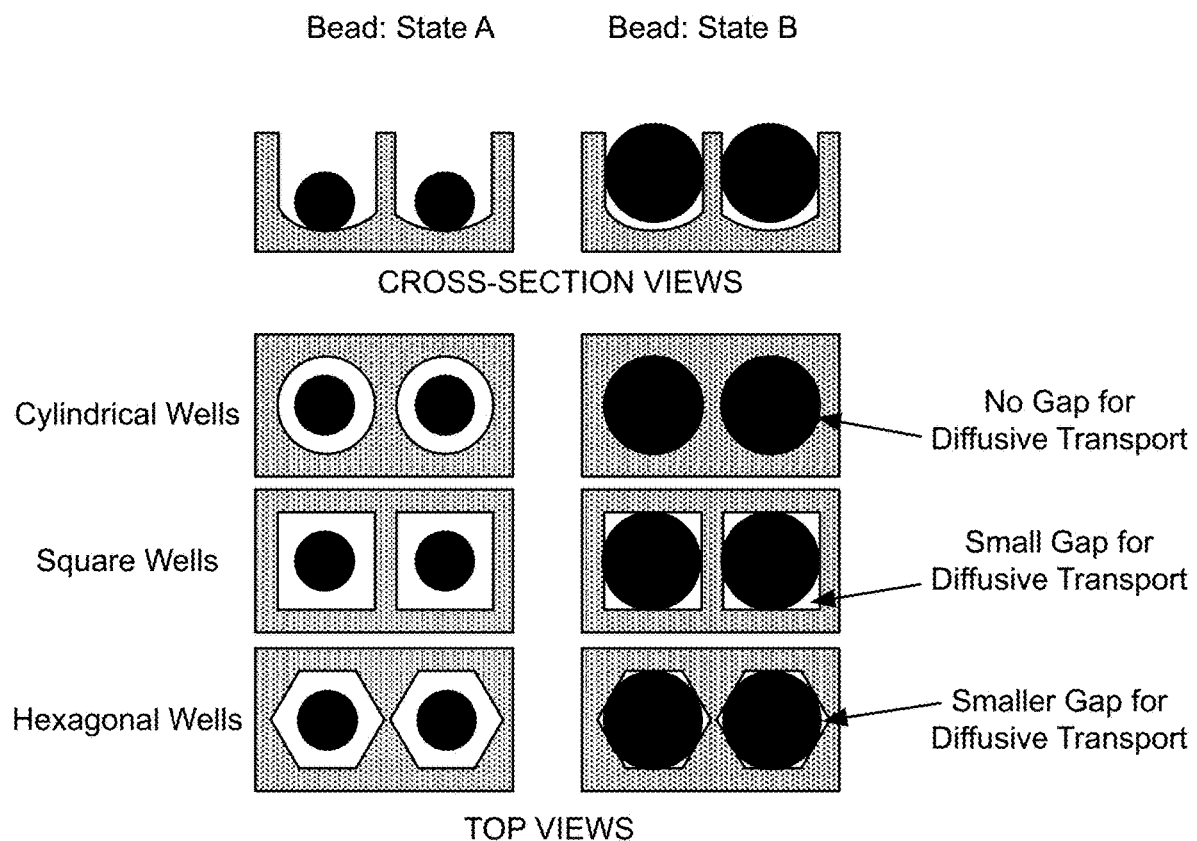
FIGS. 5A-5C depict variations of operational modes attributed to different controllable states of morphology-adjustable functionalized particles.
Figure 5B:
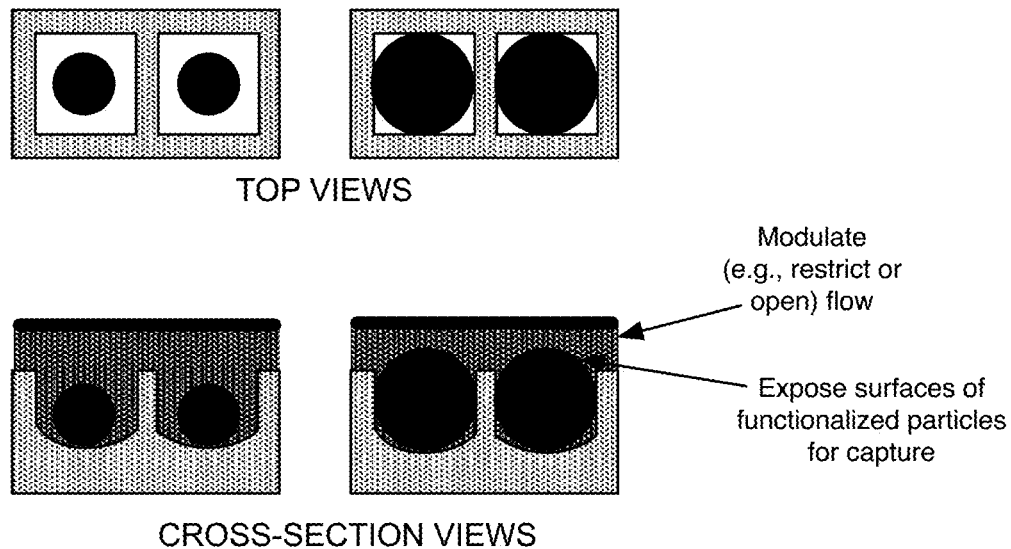

In variations shown in FIG. 5A, the functionalized particles can be positioned within partitions in a second morphological state (e.g., State A shown in FIG. 5A, left), and then transitioned to a third morphological state (e.g., State B shown in FIG. 5B, left). In more detail, functionalized particles in State B are swollen or otherwise expanded (e.g., according to methods described), where partition morphologies (e.g., microwell cross-sectional shapes) can provide: sealing with no gap or opening for diffusive transport (e.g., of reagents) past functionalized particles in State B (e.g., for microwells with open surfaces having a circular cross sections or sections complementary to that of the functionalized particle cross section). As such, transitioning the set of functionalized particles to the third morphological state can include sealing the set of microwells at said open surfaces with the set of functionalized particles in the third morphological state. Partition morphologies (e.g., microwell cross-sectional shapes) can alternatively provide partial sealing with a small gap or opening for diffusive transport (e.g., of reagents) past functionalized particles in State B (e.g., for a microwell with a non-circular/polygonal cross section having 5 or fewer sides); or partial sealing with a smaller gap or opening for diffusive transport (e.g., of reagents) past functionalized particles in State B (e.g., for a microwell with a non-circular/polygonal cross section having 6 or greater sides). In the variations shown in FIG. 5A (right), a higher degree of similarity between a cross section of the functionalized particle to a cross section of the partition/microwell provides a smaller gap for diffusive transport (e.g., of reagents) past functionalized particles in State B. As such, transitioning the set of functionalized particles to the third morphological state can include partially sealing the set of microwells at said open surfaces with the set of functionalized particles in the third morphological state, where partially sealing the set of microwells provides a gap for diffusive transport of reagents past the set of functionalized particles within the set of microwells.

In variations shown in FIG. 5B, transitioning of functionalized particles retained within partitions/microwells from a second morphological state to a third morphological state (e.g., swollen or expanded state) can be used to modulate flow within a channel, cavity, or other structure defining a flow path over the array of partitions (e.g., set of microwells). For instance, controlled particle swelling can restrict flow by reducing flow path cross sectional area, and controlled particle shrinking can open flow by enlarging flow path cross sectional area. Furthermore, controlled swelling and shrinking of functionalized particles can provide mechanisms for controllably or periodically exposing functionalized particle surfaces for capture of molecules/biomarkers transported through the flow path. As such, in variations where the set of partitions include a set of microwells positioned adjacent to a cavity defining a flow path over the set of microwells, and transitioning the set of functionalized particles to the third morphological state can include restricting flow (or controllably exposing particles to components) within the cavity by decreasing a cross section of the flow path, upon inducing swelling of the set of functionalized particles in response to the second medium (or another medium).

Figure 5C:
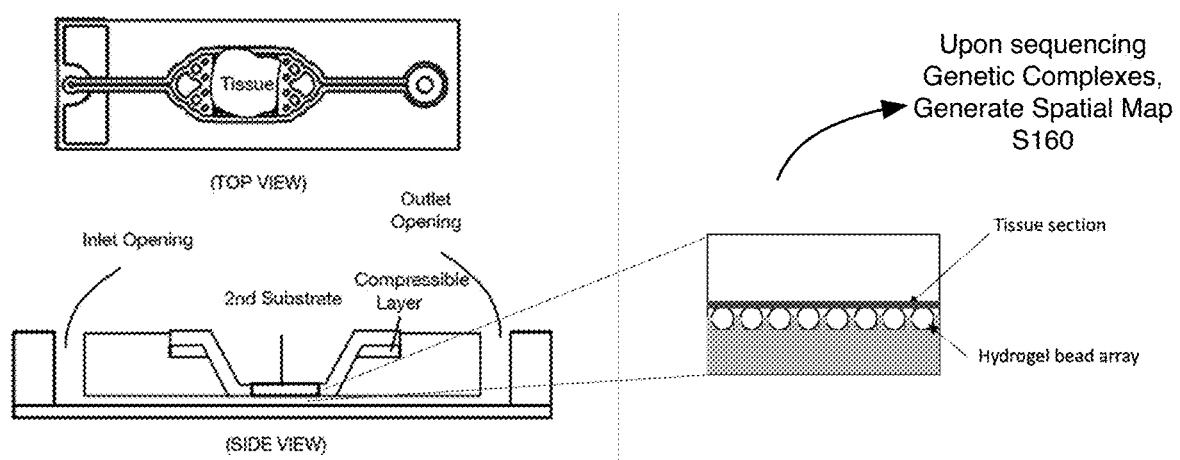

In variations shown in FIG. 5C, transitioning of functionalized particles to another morphological state (e.g., swollen or expanded state) can provide improved surface contact area (e.g., with hydrogel beads) between functionalized particles and a tissue sample, in order to characterize distributions of targets in the tissue sample. For instance, controlled states of swelling of the set of functionalized particles from addressable microwells can be used in the context of spatial transcriptomics, where, decoding positions of functionalized particles and captured targets (e.g., through sequencing) can be used to create spatial maps of captured targets. In one exemplary use case, particles can be loaded within microwells in a shrunken state, transitioned to a state in which they protrude from their respective microwells (or are otherwise able to contact sample material) by hydration with desired osmolarity factors, and interacting the microwell array, with protruding functionalized particles, with a sample (e.g., tissue sample) with the particles can be used to determine relative spatial positions of targets of the tissue sample (e.g., single cells, single cell subtypes, proteins, nucleic acids such as RNAs and DNAs, other biomarkers).

As such, in variations where the sample is a tissue sample and the set of partitions includes a set of microwells, the method 100 can include inducing contact between the tissue sample and the set of functionalized particles, upon transitioning the set of functionalized particles to the third morphological state in which the set of functionalized particles protrude from open surfaces of the set of microwells, by inducing swelling the set of functionalized particles in response to the second medium (or another medium). Upon sequencing genetic complexes resulting from said interactions between the set of functionalized particles and the tissue sample, the method 100 can then include generating a spatial map of the set of targets, thereby characterizing relative spatial distributions and/or positions of targets within the tissue sample.

In variations, the tissue sample can include one or more of: a whole tissue, a tissue portion (e.g., a histological tissue slice), a formalin-fixed paraffin-embedded (FFPE) tissue, a frozen tissue, a biopsied tissue, fresh frozen plasma, a cell-seeded scaffold, an analyte-seeded, an organ, a whole organism, an organoid, a cell suspensions including a single cell type or mixture of cells within a medium, a suspension of nuclei, an organelle, or other sample.

Furthermore, transitions between states of the functionalized particles can be used to transfer functionalized molecules (e.g., probes) between the functionalized particles and the tissue sample to enable downstream analyses according to various assays.

Furthermore, controlled degradation of the functionalized particles can facilitate release of genetic complexes generated using the set of functionalized particles, for downstream processes.

The compositions can further provide other controlled morphological states to enable other operation modes.

2.3.1 Sample Processing, Target Detection, Characterization

In variations, the method 100 can further include Step S140, which recites: inducing interactions between the set of functionalized particles and a set of targets, within the set of partitions and according to a set of operations. Step S140 can include processing one or more samples, using the set of functionalized particles at the partitions, for various tissue, cell, and/or molecular reactions (e.g., involving target capture, synthesis of nucleic acid material, amplification, library preparation, etc.). As such, Step S140 can include distribution of sample solutions and/or processing reagents across the partitions (e.g., using liquid handling apparatus described).

In examples, sample materials can include or be derived from: tissue structures, tissue pieces (e.g., tissue slices for histological applications, biopsied tissues, tissue blocks associated with seeded scaffolds, etc.), droplets of sample material, organs, whole organisms (e.g., bacteria, viruses), seeds, consumable materials (e.g., foods, beverages, pharmaceuticals, supplements etc.), cell suspensions, single cells, organelles, within organelles, crosslinked co-localized histones with attached DNA, exosomes, other microorganisms, and/or other natural or synthetic structures. Targets can thus include cells, cell-derived material, nucleic acids (e.g., RNAs, DNAs, all poly(A) mRNA molecules from a single cell, all DNA molecules from a single cell, other nucleic acids or fragments, etc.), proteins (e.g., all proteins from a single cell), amino acids, analytes, and/or other targets. Further descriptions of targets are described in Patent Applications and Issued Patents incorporated by reference.

In relation to applications of use related to detection and processing of such targets, exemplary applications of use can support one or more of: single cell processing and detection (of single cells, of single cell subtypes, etc.); cancer diagnostics (e.g., in relation to SNP analyses for specific alleles, in relation to assessment of minimum residual disease, in relation to detection of circulating tumor cells, etc.); prenatal testing (e.g., for assessment of chromosomal issues, such as aneuploidy); microbiome analysis (e.g., for characterization of hypervariable regions of 16S rRNA and/or ITS rRNA); whole genome amplification; characterization of genetically modified organisms (e.g., in the context of agriculture, in the context of seed analysis, etc.); and/or other forms of genetic testing.

Processes and reactions can be associated with one or more molecular reactions including one or more of: a reverse transcription reaction (RT-reaction), a cDNA synthesis operation, immunochemistry, DNA reactions, mRNA FISH reactions, proximity ligation reactions, bridge amplification reactions, catalytic enzymatic reactions, hybridization reactions, restriction digestion reactions, amplification reactions (e.g., mRNA and/or DNA PCR, quantitative PCR, digital PCR, isothermal amplification, such as loop-mediated isothermal amplification), and other suitable reactions.

Post-retrieval of genetic complexes using the set of functionalized particles, characterizations can be performed using a sequencing operation, such as: sequencing by hybridization, sequencing by ligation, pyrosequencing, sequencing by synthesis, high-throughput sequencing, and/or other methods. Detection can additionally or alternatively involve fluorescent detection (e.g., involving detection of fluorophores of probes used to tag targets, detection of fluorophores that operate with Foerster resonance energy transfer, etc.).

Figure 6:
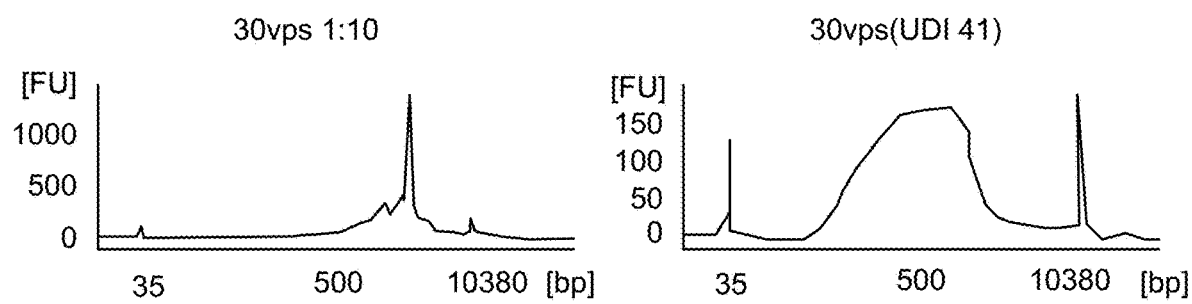
FIG. 6 depicts example results of assays performed using morphology-adjustable functionalized particles.

In one example, as shown in FIG. 6, exemplary functionalized particles as described were used to process cells (e.g., 12,000 K562 cells loaded in a viable state), with functionalized particles (e.g., 110,000 particles) pre-loaded across microwell partitions, with performance of a 3' gene expression assay, with capturing of mRNA from cells within the partitions, synthesis of cDNA, and successful generation of an indexed library. Functionalized particles were pre-loaded on Day 1, dried on Day 2, and experimented on at Day 6.

Sequencing results are provided in FIG. 7, demonstrating functionality of particles for single cell processing and sequencing applications, post-drying and storage (e.g., after 5 days, after more than 5 days). Features include estimated cells (68,525), mean reads per cell (1016.9), total unique genes (21838), median unique genes per cell (139), total UMI counts (17428974), median UMI counts per cell, input reads, captured reads %, $R_1$ duplication, $R_1$ length, $R_2$ duplication, $R_2$ length, and $R_2$ trimmed length.

Other embodiments, variations, and examples of assays that can be performed using such functionalized particles within partitions are described in U.S. application Ser. No. 16/890,417 filed 2 Jun. 2020, U.S. application Ser. No. 17/109,704 filed 2 Dec. 2020, U.S. application Ser. No. 17/499,454 filed 12 Oct. 2021, and U.S. application Ser. No. 17/499,529 filed 12 Oct. 2021, which are each incorporated herein in its entirety by this reference, as well as other applications incorporated by reference.

3. FUNCTIONAL BEAD COMPOSITION

Figure 8:
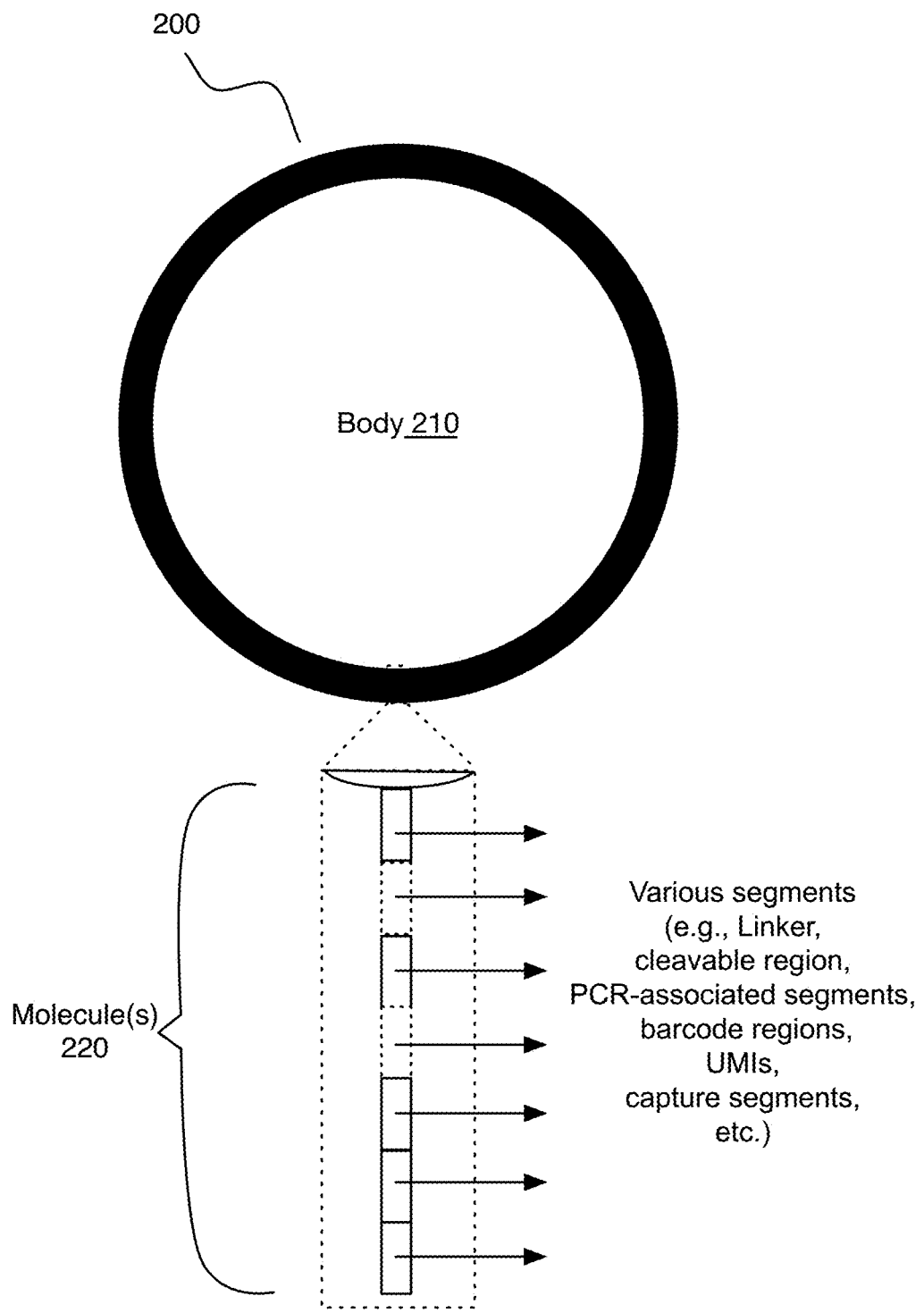
FIG. 8 depicts a schematic of an embodiment of a morphology-adjustable functionalized particle.

As shown in FIG. 8, an embodiment of a composition 200 for target material separation includes: a body 210 and one or more molecules 220 coupled to the body 110 and structured for functionalization of the composition 200.

In relation to morphology, the body 210 can have the form of a microsphere. Alternatively, the body 210 can have the form of a non-spherical (e.g., ellipsoidal, prismatic, polyhedral, amorphous, etc.) body, where a cross section taken through the body no is non-circular. The body 210 can be composed of a polymer (e.g., hydrogel), with functionality as described above. Variations of polymer compositions can include one or more of: polyacrylamides, polystyrenes, silicas, polymethylmethacrylates, aliginate, PEG, nylons, agaroses, and/or other polymers, with or without crosslinking.

Embodiments, variations, and examples of compositions of functionalized particles, with respect to thermal properties, optical properties, composite structures, mechanical properties, magnetic properties, densities, electric properties, physical properties, porosity, crosslinking, functionalization, structures of functionalized molecules, synthesis, and other aspects are further described in U.S. application Ser. No. 17/109,704 filed 2 Dec. 2020, which is herein incorporated in its entirety by this reference.

Additionally or alternatively, functionalized particles can be configured as vessels or vesicles configured to deliver contents to partitions in association with sample processing. For instance, the functionalized particles can be structured with or as semi-permeable membranes to deliver "packets" of materials to partitions (e.g., in microwell systems, in other partition formats). In one example, such functionalized particles can deliver barcoded oligonucleotides to partitions for single cell RNA sequencing applications and/or other applications, in a manner that provides improvements over compositions that require sealing of adjacent partitions (e.g., using a film or oil), where such sealing presents certain challenges to workflows. In more detail, in some applications, it is desirable to have some materials (e.g., mRNA from a cell) stay within respective partitions and other materials (e.g., a lysis reagent, other process reagents) be able to move into the partition to lyse a cell, and then move out of the partition to not interfere with subsequent steps. Delivery of materials to partitions can additionally or alternatively include inducing controlled degradation of functionalized particles, once they are positioned at their respective microwells, to release packaged materials within their respective microwells for target capture and/or other steps of sample processing.

By utilizing properties of functionalized particle designs described herein, semi-permeable barriers can be provided without the problems associated with placement and attachment of membranes or other films/oils to keep partitions divided. Such a configuration also takes advantage of the instrumentation already designed to enable delivery of functionalized particles to partitions, but with the added advantage that said functionalized particles then act as the semi-permeable barrier.

To be effective, the functionalized particle must be sized appropriately in order to fit with limited clearance around the functionalized particle. In variations, partition geometry (e.g., microwell geometry, droplet size, etc.) and functionalized particle size control can be finely tuned to complement each other. Additionally or alternatively, a set of monodisperse functionalized particles, with pores of defined sizes can operate together as a semi-permeable membrane within a partition. In such variations, hydrogel beads with semi-permeable properties can be implemented, and structured to change size in response to environmental conditions (embodiments, variations, and examples of which are described above).

In one such example, a population of hydrogel (e.g., acrylamide crosslinked with bis-acrylamide) functionalized particles (e.g., containing functionalized oligonucleotides linked to the hydrogel matrix) that are sized slightly larger than a microwell opening, can be exposed to buffers (e.g., 10 mM $MgCl_2$, another salt) containing materials that produce smaller equilibrium sizes of functionalized particles, thereby shrinking the majority of functionalized particles to a size smaller than the microwell opening. Functionalized particles in this state can then be loaded into the microwells, followed by changing the surrounding buffer (e.g., to a lower salt buffer, such as tris EDTA buffer, etc.) to produce swelling but with retention of functionalized particles in the microwells (e.g., as shown in FIG. 9A). Such a process can effectively close off/seal the microwell opening with one or more semi-permeable functionalized particles. Such a structure with tunable morphological states presents only a minor barrier to small molecules such as salts, but presents a barrier to many biomolecules or other larger molecules, thereby preventing leakage of targets. For example, mRNA from a cell would be unlikely to pass through the functionalized particles, whereas salt or certain detergents would be able to pass the functionalized particles (e.g., for buffer exchange, for other purposes).

By loading functionalized particles into partitions, followed by other materials, and then changing the buffer solution in contact with partition contents, there can be small molecule exchange with the partitions (e.g., by diffusion), but larger molecules remain sequestered within the partitions. The specific properties of the functionalized particles can further be tailored to the experimental needs. For example, the pore size of acrylamide can be altered to change the porosity and thus the size of molecules that are able to pass through the matrix. Other hydrogels and non-hydrogel materials could also be used that have specific properties relative to particular molecules of interest. Thus, by taking advantage of the size of the functionalized particles, and in particular the mutability of their sizes, utility is achieved with delivery of functionalized particles to partitions and then transitioning the functionalized particles to states that effectively seal off those partitions without needing the same degree of size control that would be required to precisely match the size of each partition. Such compositions and processes can further be used to achieve self-assembled membranes for isolating partitions that are not uniform (e.g., uniformly cylindrical). For instance, delivery of functionalized particles to wells, and then transitioning them to swollen states such that they seal off their respective wells, can provide a novel mechanism for forming a customizable and self-assembled membrane that can be controlled on-demand.

In an example, microwell partitions implemented included a draft angle to partition walls such that the opening was approximately 27 micrometers in diameter at the open surface and 22 micrometers at the base surface. Upon exchanging of a buffer within microwells to a low salt buffer, functionalized particles constructed of a hydrogel material (e.g., acrylamide) and present in the microwells remained in the microwells as they swelled. As such, the functionalized particles were transitioned to states where they became effective structures to seal partitions in a semi-permeable manner, even though the functionalized particle population has inherent size variation. In this example, functionalized particles that were sized to the opening size or greater were able to operate as semi-permanent membrane to the microwells. As such, the enormous difficulty in manufacturing functionalized particles with the size control that would otherwise be necessary is avoided, and thus by swelling the functionalized particles in situ, it is possible to achieve the desired result in a way that is practical and efficient to achieve.

For recovery, the beads can subsequently be dissolved or changed to a different size (e.g., a smaller size, a larger size, etc.) such that they can be retrieved. As a note, the draft well shape is particularly advantageous for maintaining several sequential states (e.g., a large state that does not fully fit in well, a shrunken state to to fit within and/or seal a well, an expanded state to induce popping of the functionalized particle from a well, etc.).

Figure 9B:
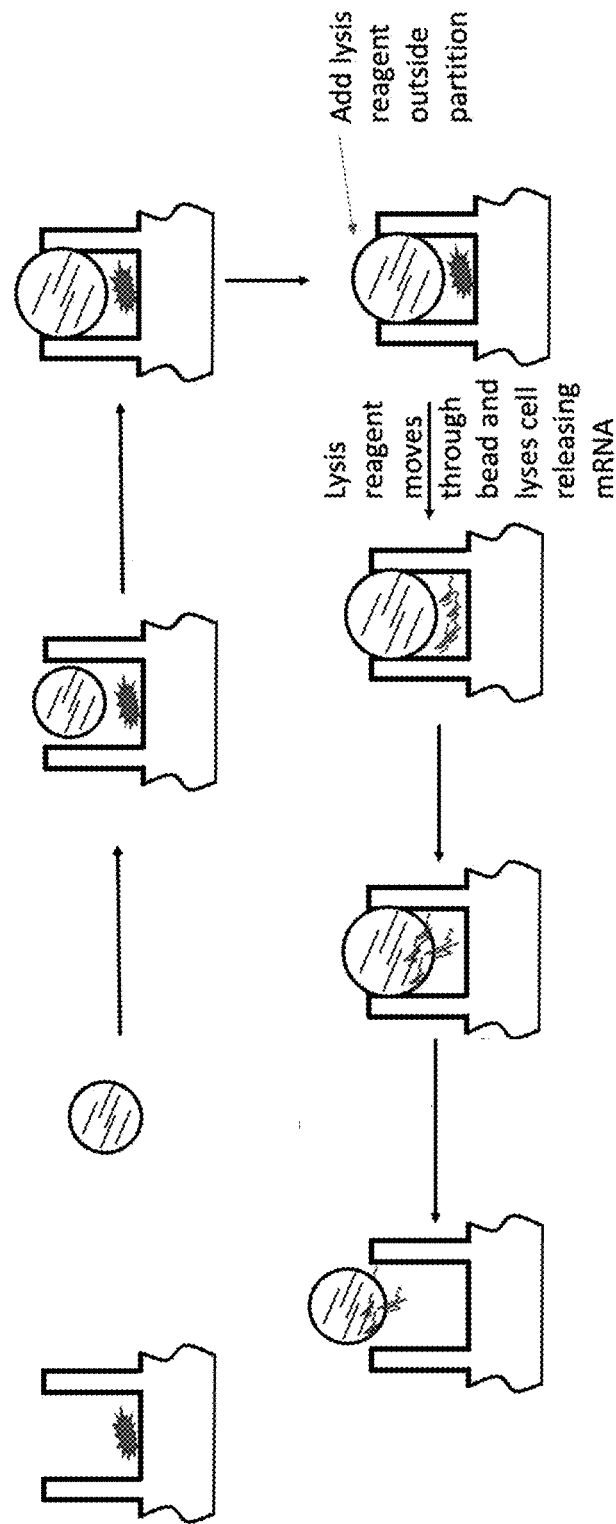

FIG. 9B depicts an example workflow for single-cell RNA sequencing, where a microwell of an array of microwells contains a single cell (as described in applications incorporated by reference), followed by delivery of a functionalized particle composed of a hydrogel (e.g., acrylamide) with attached barcoded oligonucleotide molecules (as described in applications incorporated by reference) into the microwell. Buffer exchange causes the functionalized particle to swell to an equilibrium state, thereby sealing the opening of the microwell with a semi-permeable barrier. A lysis reagent and/or other reagents can then be added, with passing of the semi-permeable barrier, thereby lysing the captured single cell and releasing mRNA, which binds to the oligonucleotide molecules of the functionalized particle. Then, buffer exchange can be implemented to shrink the functionalized particle, allowing the functionalized particle to be released from the partition, with captured mRNA material and/or derivative materials, for downstream analysis and processing. Alternatively, buffer exchange can swell the functionalized particle to a sufficient degree that the particles are forced out of the partition (e.g., with captured biomolecules and/or derivatives thereof) making the particles available for collection or other downstream processing.

In another example, the opening of a microwell can have a ridge (e.g., a protruding ring radially into an open surface of the well). After shrinking and loading of the hydrogel particle into the well, the particle can be swelled and made more buoyant. The particle will then make contact with the ridge and the particle will create a seal with the microwell at the ridge. The ridge can contact particle attachment motifs to prevent escape of the swelling hydrogel.

Other applications can be implemented using such functionalized particles that can operate as semi-permeable membranes.

5. CONCLUSION

The FIGURES illustrate the architecture, functionality and operation of possible implementations of systems, methods and computer program products according to preferred embodiments, example configurations, and variations thereof. In this regard, each block in the flowchart or block diagrams may represent a module, segment, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
  distributing a set of functionalized particles, in a first morphological state, across a set of partitions using a first medium;
  transitioning the set of functionalized particles, at the set of partitions, from the first morphological state to a second morphological state;
  inducing interactions between the set of functionalized particles and a set of targets of a sample, within the set of partitions and according to a set of operations with a set of process fluids; and
  transitioning the set of functionalized particles, at the set of partitions, to a third morphological state with a second medium, contemporaneously with said induced interactions.

2. The method of claim 1, wherein the first morphological state is a first state of swelling in which the set of functionalized particles have a first size, and wherein the third morphological state is a third state of swelling in which the set of functionalized particles have a third size greater than the first size.

3. The method of claim 2, wherein the first medium is identical to the second medium.

4. The method of claim 2, wherein the set of partitions comprises a set of microwells with open surfaces having circular cross sections, and wherein transitioning the set of functionalized particles to the third morphological state comprises sealing the set of microwells at said open surfaces with the set of functionalized particles in the third morphological state.

5. The method of claim 2, wherein the set of partitions comprises a set of microwells with open surfaces having polygonal cross sections, and wherein transitioning the set of functionalized particles to the third morphological state comprises partially sealing the set of microwells at said open surfaces with the set of functionalized particles in the third morphological state, where partially sealing the set of microwells provides a gap for diffusive transport of reagents past the set of functionalized particles within the set of microwells.

6. The method of claim 2, wherein the set of partitions comprises a set of microwells, and wherein transitioning the set of functionalized particles to the third morphological state comprises releasing the set of functionalized particles from the set of microwells by inducing swelling in response to the second medium.

7. The method of claim 2, wherein the set of partitions comprises a set of microwells positioned adjacent to a cavity defining a flow path over the set of microwells, and wherein transitioning the set of functionalized particles to the third morphological state comprises restricting flow within the cavity by decreasing a cross section of the flow path, upon inducing swelling of the set of functionalized particles in response to the second medium.

8. The method of claim 2, wherein the sample comprises a tissue sample, wherein the set of partitions comprises a set of microwells, and wherein inducing interactions comprises inducing contact between the tissue sample and the set of functionalized particles, upon transitioning the set of functionalized particles to the third morphological state in which the set of functionalized particles protrude from open surfaces of the set of microwells, by inducing swelling the set of functionalized particles in response to the second medium.

9. The method of claim 8, further comprising generating a spatial map of the set of targets, upon sequencing genetic complexes resulting from said interactions between the set of functionalized particles and the tissue sample.

10. The method of claim 2, wherein the set of targets comprises nucleic acids of a set of single cells of the sample, wherein the set of partitions comprises a set of microwells, and wherein inducing interactions comprises co-capturing the set of single cells with the set of functionalized particles within the set of partitions, with the set of functionalized particles in the second morphological state.

11. The method of claim 10, wherein the second morphological state is a second state of swelling, in which the set of functionalized particles are dehydrated and have a second size smaller than the first size.

12. The method of claim 11, wherein the set of partitions comprises a set of microwells having a height equal to a characteristic diameter of the set of functionalized particles in the first morphological state during loading of the set of functionalized particles at the set of microwells.

13. The method of claim 12, wherein inducing interactions between the set of functionalized particles and the set of targets of the sample comprises delivering single cells to the set of partitions with the set of functionalized particles in the second state of swelling.

14. The method of claim 11, further comprising transitioning the set of functionalized particles to a fourth morphological state in which the set of functionalized particles are dissolved with an exogenous agent.

15. The method of claim 1, wherein the set of targets comprise a set of target nucleic acids of the sample, and wherein the set of operations comprises performing a reverse transcription reaction, a cDNA synthesis operation, and amplification reaction upon the set of targets with the set of process fluids.

16. The method of claim 1, wherein the first medium and second medium each comprise an aqueous medium, and wherein a process fluid of the set of process fluids comprises a polymer component configured to counteract osmotic swelling of the set of functionalized particles.

17. A method comprising:
  distributing a set of functionalized particles, in a first state of swelling, across a set of wells using a first medium;
  transitioning the set of functionalized particles, at the set of wells, from the first state of swelling to a second state of swelling;
  inducing interactions between the set of functionalized particles and a set of targets of a sample, within the set of wells and according to a set of operations with a set of process fluids; and
  transitioning the set of functionalized particles, at the set of wells, from the second state of swelling to a third state of swelling with a second medium.

18. The method of claim 17, wherein the set of functionalized particles have a first size in the first state of swelling, wherein the second state of swelling is a dehydrated state in which the set of functionalized particles have a second size smaller than the first size, and wherein the set of functionalized particles have a third size greater than the first size in the third state of swelling.

19. The method of claim 18, wherein the first medium is identical to the second medium.

20. The method of claim 17, wherein the set of targets comprises targets of at least one of a) a population of single cells, and b) a tissue sample.

* * * * *